United States Patent
Liu et al.

(10) Patent No.: US 12,490,152 B2
(45) Date of Patent: Dec. 2, 2025

(54) NODE HANDOVER METHOD AND RELATED DEVICE

(71) Applicant: HUAWEI TECHNOLOGIES CO., LTD., GuangDong (CN)

(72) Inventors: Jing Liu, Shanghai (CN); Yuanping Zhu, Shanghai (CN); Yulong Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 18/174,020

(22) Filed: Feb. 24, 2023

(65) Prior Publication Data

US 2023/0199575 A1 Jun. 22, 2023

Related U.S. Application Data

(63) Continuation of application No. PCT/CN2020/112681, filed on Aug. 31, 2020.

(51) Int. Cl.
*H04W 36/00* (2009.01)
*H04W 36/08* (2009.01)
*H04W 36/30* (2009.01)

(52) U.S. Cl.
CPC ....... *H04W 36/0033* (2013.01); *H04W 36/08* (2013.01); *H04W 36/30* (2013.01)

(58) Field of Classification Search
CPC . H04W 36/0061; H04W 24/02; H04W 76/12; H04W 88/08; H04W 40/22; H04W 28/086; H04W 84/04
See application file for complete search history.

(56) References Cited

U.S. PATENT DOCUMENTS

2021/0378035 A1* 12/2021 Zhu ................. H04W 36/0019
2022/0369190 A1* 11/2022 Diao ................... H04W 76/20
2023/0116455 A1* 4/2023 Takeda ............... H04W 36/08
370/331

FOREIGN PATENT DOCUMENTS

CN 102752818 A 10/2012
CN 111093286 A 5/2020
WO 2012134116 A2 10/2012

OTHER PUBLICATIONS

Ericsson, "Inter-donor Migration in IAB Networks", General Principles. 3GPP TSG-RAN WG3 Meeting #109-e, Online, Aug. 17-27, 2020, R3-205221; 3 total pages.
Samsung: "Discussion on inter-donor IAB node migration," 3GPP TSG-RAN WG3 #109-e, Aug. 17-28, 2020, Online, R3-205411; 6 total pages.

* cited by examiner

*Primary Examiner* — Iqbal Zaidi
(74) *Attorney, Agent, or Firm* — Rimon PC

(57) ABSTRACT

Embodiments of this application provide a node handover method, in which a source donor node sends a handover request message to a target donor node, where the handover request message includes context information of an integrated access and backhaul (IAB) node and context information of at least one terminal device. The source donor node receives a handover response message sent by the target donor node, where the handover response message includes an identifier of an accepted terminal device in the at least one terminal device and/or an identifier of a rejected terminal device in the at least one terminal device.

17 Claims, 13 Drawing Sheets

NODE HANDOVER METHOD AND RELATED DEVICE

CROSS-REFERENCE TO RELATED APPLICATIONS

This application is a continuation of International Application No. PCT/CN2020/112681, filed on Aug. 31, 2020, the disclosure of which is hereby incorporated by reference in its entirety.

TECHNICAL FIELD

This application generally relates to the communication field, and in particular, to a node handover method and a related device.

BACKGROUND

According to a protocol standard for a 5th generation (5G) cellular mobile communication system formulated by the 3rd Generation Partnership Project (3GPP) standard organization, compared with a long term evolution (LTE) system, a new radio (NR) system supports a larger transmission bandwidth, more transceiver antenna arrays, a higher transmission rate, and a more flexible and smaller-granularity scheduling mechanism. The foregoing features extend application scopes for the NR system.

In an existing NR system, a terminal device exchanges data with an integrated access and backhaul (IAB) donor node in an IAB scenario. There is at least one IAB node between the terminal device and the IAB donor node, and the terminal device sets up a communication connection to the IAB donor node through the at least one IAB node. The IAB node further includes two parts: an IAB-distributed unit (IAB-DU) and an IAB-mobile terminal (IAB-MT).

When the IAB node is handed over to the IAB donor node, in a conventional technology, the IAB-MT in the IAB node may be handed over from a source donor node to a target donor node, but processing of the IAB-DU in the IAB node and a child node (for example, the terminal device or another IAB node) of the IAB node is not involved. Consequently, the child node of the IAB node cannot normally operate after the IAB node is handed over.

SUMMARY

This application provides a node handover method and a related device. A source donor node triggers an integrated access and backhaul (IAB) node and a child node (for example, another IAB node or a terminal) of the IAB node to be handed over to a target donor node together, to ensure normal transmission of data of the terminal device after the IAB node is handed over.

According to a first aspect of this application, a node handover method is provided. In the method, a source donor node sends a handover request message to a target donor node, where the handover request message includes context information of an IAB node and context information of at least one terminal device, the handover request message requests to hand over the IAB node and the at least one terminal device to the target donor node, and a terminal device of the at least one terminal device is directly connected to the IAB node, or the terminal device is connected to the IAB node through at least one other IAB node. The source donor node receives a handover response message sent by the target donor node, where the handover response message includes an identifier of an accepted terminal device in the at least one terminal device and/or an identifier of a rejected terminal device in the at least one terminal device.

In this application, the terminal device that is in the at least one terminal device connected to the IAB node and that is accepted by the target donor node is handed over to the target donor node, so that the IAB node and the accepted terminal device are handed over to the target donor node together, and normal transmission of data of the accepted terminal device is ensured.

In a possible implementation of the first aspect, if the terminal device is directly connected to the IAB node, the method further includes: the source donor node receives a measurement result sent by the IAB node, where the measurement result includes a result of measuring signal quality of a serving cell by the IAB node and a result of measuring signal quality of a neighboring cell by the IAB node; and the source donor node determines, based on the measurement result, to hand over the IAB node and the at least one terminal device to the target donor node.

In this possible implementation, if the source donor node determines that the signal quality of the serving cell is better than that of the neighboring cell, the source donor node does not need to send the handover request message to the target donor node. If the IAB node does not operate in a carrier aggregation (CA) mode, there is one serving cell. If signal quality of one neighboring cell is higher than signal quality of the serving cell, the source donor node determines, based on the measurement result, to hand over the IAB node and the at least one terminal device to the target donor node. If the IAB node operates in a CA mode, the serving cell includes one primary cell and at least one secondary cell. If signal quality of one neighboring cell is higher than signal quality of the primary cell, the source donor node determines, based on the measurement result, to hand over the IAB node and the at least one terminal device to the target donor node. In this possible implementation, it is ensured that the IAB node and the at least one terminal device are handed over when the signal quality of the neighboring cell is better than the signal quality of the current cell. This improves communication quality of the IAB node and the at least one terminal device.

In a possible implementation of the first aspect, if the terminal device is connected to the IAB node through the at least one other IAB node, the handover request message further includes context information of the other IAB node (e.g., a first IAB node of the at least one IAB node), and the handover response message further includes an identifier of another accepted IAB node in the at least one other IAB node, and/or an identifier of another rejected IAB node in the at least one other IAB node.

In this possible implementation, the handover response message received by the source donor node includes the identifier of the other accepted IAB node in the at least one other IAB node, and/or the identifier of the other rejected IAB node in the at least one other IAB node. In this implementation, the target donor node selects the other accepted IAB node based on network load and the like of the target donor node. This helps make full use of resources of the target donor node, and avoids a handover failure caused by insufficient resources of the target donor node.

In a possible implementation of the first aspect, the method further includes:

The source donor node receives a measurement result sent by the IAB node, where the measurement result includes a result of measuring signal quality of a serving cell by the IAB node and a result of measuring signal quality of a neighboring cell by the IAB node; and the source donor node determines, based on the measurement result, to hand over the IAB node, the at least one other IAB node, and the at least one terminal device to the target donor node.

In this possible implementation, if the source donor node determines that the signal quality of the serving cell is better than that of the neighboring cell, the source donor node does not need to send the handover request message to the target donor node. If the IAB node does not operate in a CA mode, there is one serving cell. If signal quality of one neighboring cell is higher than signal quality of the serving cell, the source donor node may determine, based on the measurement result, to hand over the IAB node, the at least one other IAB node, and the at least one terminal device to the target donor node. If the IAB node operates in a CA mode, the serving cell includes one primary cell and at least one secondary cell. If signal quality of one neighboring cell is higher than signal quality of the primary cell, the source donor node may determine, based on the measurement result, to hand over the IAB node, the at least one other IAB node, and the at least one terminal device to the target donor node. In this possible implementation, it is ensured that the IAB node, the at least one other IAB node, and the at least one terminal device are handed over when the signal quality of the neighboring cell is better than the signal quality of the current cell. This improves communication quality of the IAB node, the at least one other IAB node, and the at least one terminal device.

In a possible implementation of the first aspect, the IAB node includes an integrated access and backhaul-mobile terminal (IAB-MT) and an integrated access and backhaul-distributed unit (IAB-DU), the context information of the IAB node includes context information of the IAB-MT and context information of the IAB-DU, the context information of the IAB-MT includes configuration information of a backhaul radio link control channel (BH RLC CH) between the IAB-MT and a parent node of the IAB node, and the context information of the IAB-DU includes an identifier of the IAB-DU and/or an identifier of cell served by the IAB-DU.

In this possible implementation, the source donor node transfers the context information of the IAB node to the target donor node, so that the target donor node prepares to hand over a resource for the IAB node based on the context information. In this possible implementation, a success rate of handing over the IAB node to the target donor node is improved.

In a possible implementation of the first aspect, the context information of the IAB-DU further includes activation indication information of a cell served by the IAB-DU, and the activation indication information indicates whether the cell served by the IAB-DU has been activated. In this possible implementation, it is ensured that an activated cell can still remain (e.g., maintain) normal communication after the IAB node is handed over to the target donor node.

In this possible implementation, the target donor node learns of specific cells of the IAB-DU that have been activated by the source donor node, and these cells still need to be activated by the target donor node after the IAB node is handed over to the target donor node. In this possible implementation, it is ensured that a cell that has been activated after the IAB node is handed over to the target donor node can still remain normal communication.

In a possible implementation of the first aspect, the context information of the IAB node further includes a backhaul adaptation protocol (BAP) address allocated by the source donor node to the IAB node.

In this possible implementation, the target donor node learns of the BAP address allocated by the source donor node to the IAB node, so that a BAP address newly allocated by the target donor node to the IAB node is different from the BAP address allocated by the source donor node to the IAB node.

In a possible implementation of the first aspect, the context information of the terminal device includes an identifier of the terminal device, and the identifier of the terminal device includes a physical cell identifier (PCI) of a cell accessed by the terminal device and a cell-radio network temporary identifier (C-RNTI) of the terminal device in the accessed cell.

In this possible implementation, because a PCI of a cell served by the IAB-DU remains unchanged before and after the IAB node is handed over, the target donor node identifies the terminal device based on the identifier of the terminal device. In this possible implementation, accuracy of identifying the terminal device by the target donor node is improved.

In a possible implementation of the first aspect, the context information of the IAB node further includes an identifier of a child node of the IAB node, and the identifier indicates a topology relationship between the IAB node and the child node of the IAB node.

In this possible implementation, the target donor node can learn of a topology relationship between nodes that prepare to be handed over.

In a possible implementation of the first aspect, the context information of the IAB node further includes network topology list information. If the terminal device is directly connected to the IAB node, the network topology list information indicates a topology relationship between the IAB node and the terminal device. If the terminal device is connected to the IAB node through the at least one other IAB node, the network topology list information indicates a topology relationship between the IAB node and the other IAB node, and a topology relationship between the other IAB node and the terminal device.

In this possible implementation, the target donor node learns of a topology relationship between nodes that prepare to be handed over.

In a possible implementation of the first aspect, the other IAB node includes another IAB-MT and another IAB-DU, the context information of the other IAB node includes context information of the other IAB-MT and context information of the other IAB-DU, the context information of the other IAB-MT includes configuration information of a BH RLC CH between the other IAB-MT and a parent node of the other IAB node, and the context information of the other IAB-DU includes an identifier of the other IAB-DU and/or an identifier of a cell served by the other IAB-DU.

In this possible implementation, the source donor node transfers the context information of the other IAB node to the target donor node, so that the target donor node prepares to hand over a resource for the other IAB node based on the context information. In this possible implementation, a success rate of handing over the other IAB node to the target donor node with the IAB node is improved.

In a possible implementation of the first aspect, the context information of the other IAB-DU further includes activation indication information of a cell served by the other IAB-DU, and the activation indication information of the cell served by the other IAB-DU indicates whether the cell served by the other IAB-DU has been activated.

In this possible implementation, the target donor node learns of specific cells of the other IAB-DU that have been activated by the source donor node, and these cells still need to be activated by the target donor node after the other IAB node is handed over to the target donor node. In this possible implementation, it is ensured that the activated cells can still remain (e.g., maintain) normal communication after the other IAB node is handed over to the target donor node.

In a possible implementation of the first aspect, the context information of the other IAB node further includes a BAP address allocated by the source donor node to the other IAB node.

In this possible implementation, the target donor node learns of the BAP address allocated by the source donor node to the other IAB node, so that a BAP address newly allocated by the target donor node to the other IAB node is different from the BAP address allocated by the source donor node to the other IAB node.

In a possible implementation of the first aspect, the context information of the other IAB node further includes an identifier of a parent node of the other IAB node, and/or an identifier of a child node of the other IAB node, and the identifier indicates a topology relationship between the other IAB node and the parent node of the other IAB node, and/or between the other IAB node and the child node of the other IAB node.

In this possible implementation, the target donor node can learn of a topology relationship between nodes that prepare to be handed over.

In a possible implementation of the first aspect, the source donor node includes a source donor-centralized unit (CU), the target donor node includes a target donor-CU, and the method further includes: The source donor-CU obtains, from the handover response message, a first radio resource control RRC message generated by the target donor-CU, where the first RRC message includes cell configuration information after a first IAB node is handed over to the target donor node, and the first IAB node includes the IAB node and another accepted IAB node in the other IAB nods; and the source donor-CU sends the first RRC message to the first IAB node.

The transmission manner of the cell configuration information provided in this possible implementation slightly affects an existing standard, and therefore implementability of the solution is improved.

In a possible implementation of the first aspect, the source donor node includes a source donor-CU, the target donor node includes a target donor-CU, and the method further includes: The source donor-CU obtains, from the handover response message, a first F1 application protocol (F1AP) message generated by the target donor-CU, where the first F1AP message includes cell configuration information after a first IAB node is handed over to the target donor node, and the first IAB node includes the IAB node and another accepted IAB node in the other IAB nodes; and the source donor-CU encapsulates the first F1AP message in a second F1AP message, and sends the second F1AP message to the first IAB node.

In this possible implementation, a transmission manner of the cell configuration information is to transmit update cell configuration information by using an existing F1AP message between the source donor-CU and the first IAB node, and a change to a standard protocol procedure is small, thereby improving the implementability of the solution.

In a possible implementation of the first aspect, the source donor node includes a source donor-CU, the target donor node includes a target donor-CU, and the method further includes: The source donor-CU obtains, from the handover response message, cell configuration information after a first IAB node is handed over to the target donor node, where the first IAB node includes the IAB node and another accepted IAB node in the other IAB nodes; and the source donor-CU encapsulates the cell configuration information in an F1AP message, and sends the F1AP message to the first IAB node.

In this possible implementation, a transmission manner of the cell configuration information is to transmit update cell configuration information by using an existing F1AP message between the source donor-CU and the first IAB node, and a change to a standard protocol procedure is small, thereby improving the implementability of the solution.

According to a second aspect of this application, a node handover method is provided. The method includes: A target donor node receives a handover request message sent by a source donor node, where the handover request message includes context information of an integrated access and backhaul IAB node and context information of at least one terminal device, the handover request message requests to hand over the IAB node and the at least one terminal device to the target donor node, and the terminal device is directly connected to the IAB node, or the terminal device is connected to the IAB node through at least one other IAB node. The target donor node sends a handover response message to the source donor node, where the handover response message includes an identifier of an accepted terminal device in the at least one terminal device and/or an identifier of a rejected terminal device in the at least one terminal device.

In a possible implementation of the second aspect, the target donor node includes a target donor-CU, and the method further includes: The target donor-CU sends a context setup request message to a first IAB node, where the context setup request message carries an identifier of the terminal device, and the identifier of the terminal device includes an identifier of a cell that is accessed by the terminal device and that is served by the first IAB node and an identifier C-RNTI of the terminal device in the accessed cell; and if the terminal device is directly connected to the IAB node, the first IAB node is the IAB node; or if the terminal device is connected to the IAB node through the at least one other IAB node, the first IAB node is the at least one other IAB node.

In this possible implementation, an IAB donor node (donor-CU) sends the context setup request message of the terminal device to a parent node (an IAB-DU part of the parent node) of the IAB node, so that the parent node of the IAB node allocates an air interface resource to the IAB node, sets up a BH RLC CH between the IAB node and the parent node of the IAB node, and sets up a corresponding general packet radio services (GPRS) tunneling protocol (GTP) tunnel between the parent node of the IAB node and the IAB donor node to transmit backhaul data of the IAB node.

In a possible implementation of the second aspect, the IAB node includes an IAB-MT and an IAB-DU, the context information of the IAB node includes context information of the IAB-MT and context information of the IAB-DU, the context information of the IAB-MT includes configuration information of a BH RLC CH between the IAB-MT and a parent node of the IAB node, and the context information of the IAB-DU includes an identifier of the IAB-DU and/or an identifier of a cell served by the IAB-DU.

In this possible implementation, the source donor node transfers context information of the other IAB node to the target donor node, so that the target donor node prepares to hand over a resource for the other IAB node based on the context information. In this possible implementation, a success rate of handing over the other IAB node to the target donor node with the IAB node is improved.

In a possible implementation of the second aspect, the context information of the IAB-DU further includes activation indication information of a cell served by the IAB-DU, and the activation indication information indicates whether the cell served by the IAB-DU has been activated.

In this possible implementation, the target donor node learns of specific cells of the IAB-DU that have been activated by the source donor node, and these cells still need to be activated by the target donor node after the IAB node is handed over to the target donor node. In this possible implementation, it is ensured that a cell that has been activated after the other IAB node is handed over to the target donor node can still remain normal communication.

In a possible implementation of the second aspect, the context information of the IAB node further includes a BAP address allocated by the source donor node to the IAB node.

In this possible implementation, the target donor node learns of the BAP address allocated by the source donor node to an IAB node, so that a BAP address newly allocated by the target donor node to the other IAB node is different from the BAP address allocated by the source donor node to the other IAB node.

In a possible implementation of the second aspect, the context information of the terminal device includes an identifier of the terminal device, and the identifier of the terminal device includes a PCI of a cell accessed by the terminal device and an identifier C-RNTI of the terminal device in the accessed cell.

In this possible implementation, because a PCI of a cell served by the IAB-DU remains unchanged before and after the IAB node is handed over, the target donor node identifies the terminal device based on the identifier of the terminal device. In this possible implementation, accuracy of identifying the terminal device by the target donor node is improved.

In a possible implementation of the second aspect, the context information of the IAB node further includes an identifier of a child node of the IAB node, and the identifier indicates a topology relationship between the IAB node and the child node of the IAB node.

In this possible implementation, the target donor node can learn of a topology relationship between nodes that prepare to be handed over. In a possible implementation of the second aspect, the context information of the IAB node further includes network topology list information. If the terminal device is directly connected to the IAB node, the network topology list information indicates a topology relationship between the IAB node and the terminal device. If the terminal device is connected to the IAB node through the at least one other IAB node, the network topology list information indicates a topology relationship between the IAB node and the other IAB node, and a topology relationship between the other IAB node and the terminal device.

In this possible implementation, the target donor node learns of a topology relationship between nodes that prepare to be handed over.

In a possible implementation of the second aspect, the other IAB node includes another IAB-MT and another IAB-DU, the context information of the other IAB node includes context information of the other IAB-MT and context information of the other IAB-DU, the context information of the other IAB-MT includes configuration information of a BH RLC CH between the other IAB-MT and a parent node of the other IAB node, and the context information of the other IAB-DU includes an identifier of the other IAB-DU and/or an identifier of a cell served by the other IAB-DU.

In this possible implementation, the source donor node transfers context information of the other IAB node to the target donor node, so that the target donor node prepares to hand over a resource for the other IAB node based on the context information. In this possible implementation, a success rate of handing over the other IAB node to the target donor node with the IAB node is improved.

In a possible implementation of the second aspect, the context information of the other IAB-DU further includes activation indication information of a cell served by the other IAB-DU, and the activation indication information of the cell served by the other IAB-DU indicates whether the cell served by the other IAB-DU has been activated.

In this possible implementation, the target donor node learns of specific cells of the other IAB-DU that have been activated by the source donor node, and these cells still need to be activated by the target donor node after the other IAB node is handed over to the target donor node. In this possible implementation, it is ensured that the activated cells can still remain normal communication after the other IAB node is handed over to the target donor node.

In a possible implementation of the second aspect, the context information of the other IAB node further includes a BAP address allocated by the source donor node to the other IAB node.

In this possible implementation, the target donor node learns of the BAP address allocated by the source donor node to the other IAB node, so that a BAP address newly allocated by the target donor node to the other IAB node is different from the BAP address allocated by the source donor node to the other IAB node.

In a possible implementation of the second aspect, the context information of the other IAB node further includes an identifier of a parent node of the other IAB node, and/or an identifier of a child node of the other IAB node, and the identifier indicates a topology relationship between the other IAB node and the parent node of the other IAB node, and/or between the other IAB node and the child node of the other IAB node.

In this possible implementation, the target donor node can learn of a topology relationship between the IAB node that prepares to be handed over and the other IAB node.

In a possible implementation of the second aspect, the target donor node includes a target donor-CU, and that the target donor node sends a handover response message to the source donor node includes: The target donor-CU sends the handover response message to the source donor node, where the handover response message includes a first radio resource control (RRC) message, the first RRC message includes cell configuration information after the first IAB node is handed over to the target donor node, and the first IAB node includes the IAB node and another accepted IAB node in the other IAB nodes.

The transmission manner of the cell configuration information provided in this possible implementation slightly affects an existing standard, and therefore the implementability of the solution is improved.

In a possible implementation of the second aspect, the target donor node includes a target donor-CU, and that the target donor node sends a handover response message to the source donor node includes: the target donor-CU sends the handover response message to the source donor node, where the handover response message includes a first F1AP message, the first F1AP message includes cell configuration information after the first IAB node is handed over to the target donor node, and the first IAB node includes the IAB node and another accepted IAB node in the other IAB nodes.

In this possible implementation, a transmission manner of the cell configuration information is to transmit update cell configuration information by using an existing F1AP message between the source donor-CU and the first IAB node, and a change to a standard protocol procedure is small, thereby improving the implementability of the solution.

In a possible implementation of the second aspect, the target donor node includes a target donor-CU, and that the target donor node sends a handover response message to the source donor node includes: the target donor-CU sends the handover response message to the source donor node, where the handover response message includes cell configuration information after the first IAB node is handed over to the target donor node, and the first IAB node includes the IAB node and another accepted IAB node in the other IAB nodes.

In this possible implementation, a transmission manner of the cell configuration information is to transmit update cell configuration information by using an existing F1AP message between the source donor-CU and the first IAB node, and a change to a standard protocol procedure is small, thereby improving the implementability of the solution.

In a possible implementation of the second aspect, the target donor node includes a target donor-CU, and the method further includes: the target donor-CU sends first indication information to the other IAB node, where the first indication information indicates that handover of the IAB node is completed.

In this possible implementation, the target donor-CU sends the first indication information to the other IAB node, and the other IAB node can sense, by using the first indication information, that handover of the IAB node is completed. In other words, the other IAB node can sense that a link between the IAB node and the target donor node is available. Therefore, an IAB-DU of the other IAB node may determine time for triggering application layer processing.

In a possible implementation of the second aspect, before that the target donor-CU sends first indication information to the other IAB node, the method further includes: the target donor-CU sends second indication information to the other IAB node, where the second indication information indicates that the IAB node is being handed over or prepares to be handed over.

In this possible implementation, the target donor-CU sends the second indication information to the other IAB node, and the other IAB node can sense, by using the second indication information, that the IAB node is being handed over or prepares to be handed over. In other words, the other IAB node can sense that a link between the IAB node and the target donor node is unavailable. Therefore, an IAB-DU of the other IAB node may determine, by using the second indication information, not to trigger application layer processing.

According to a third aspect of this application, a node handover method is provided. In the method, an IAB node is handed over from a source donor node to a target donor node; and the IAB node sends first indication information to a child node of the IAB node, where the first indication information indicates that handover of the IAB node is completed. The child node of the IAB node is a terminal device or another IAB node.

In this application, the IAB node sends the first indication information to the other IAB node, and the other IAB node can sense, by using the first indication information, that handover of the IAB node is completed. In other words, the other IAB node can sense that a link between the IAB node and the target donor node is available. Therefore, an IAB-DU of the other IAB node may determine time for triggering application layer processing.

In a possible implementation of the third aspect, before that the IAB node sends first indication information to a child node of the IAB node, the method further includes: the IAB node sends second indication information to the child node of the IAB node, where the second indication information indicates that the IAB node is being handed over or prepares to be handed over.

In this possible implementation, the IAB node sends the second indication information to the other IAB node, and the other IAB node can sense, by using the second indication information, that the IAB node is being handed over or prepares to be handed over. In other words, the other IAB node can sense that a link between the IAB node and the target donor node is unavailable. Therefore, an IAB-DU of the other IAB node may determine, by using the second indication information, not to trigger application layer processing.

According to a fourth aspect of this application, an IAB donor node is provided. The IAB donor node includes at least a sending unit (e.g., sending circuit), a receiving unit (e.g., receiving circuit), and a processing unit (e.g., processing circuit), where the sending unit is configured to perform a sending action of the source donor node in the node handover method provided in any one of the first aspect or the possible implementations of the first aspect; the receiving unit is configured to perform a receiving action of the source donor node in the node handover method provided in any one of the first aspect or the possible implementations of the first aspect; and the processing unit is configured to perform a processing action of the source donor node in the node handover method provided in any one of the first aspect or the possible implementations of the first aspect.

According to a fifth aspect of this application, an IAB donor node is provided. The IAB donor node includes at least a sending unit, a receiving unit, and a processing unit, where the sending unit is configured to perform a sending action of the target donor node in the node handover method provided in any one of the second aspect or the possible implementations of the second aspect; the receiving unit is configured to perform a receiving action of the target donor node in the node handover method provided in any one of the second aspect or the possible implementations of the second aspect; and the processing unit is configured to perform a processing action of the target donor node in the node handover method provided in any one of the second aspect or the possible implementations of the second aspect.

According to a sixth aspect of this application, an IAB node is provided. The IAB node includes at least a sending unit, a receiving unit, and a processing unit, where the sending unit is configured to perform a sending action of the IAB node in the node handover method according to any one of the third aspect or the possible implementations of the third aspect; the receiving unit is configured to perform a receiving action of the IAB node in the node handover method provided in any one of the third aspect or the possible implementations of the third aspect; and the processing unit is configured to perform a processing action of the IAB node in the node handover method provided in any one of the third aspect or the possible implementations of the third aspect.

According to a seventh aspect of this application, a communication apparatus is provided. The communication apparatus includes a processor. The processor is coupled to a memory, the memory is configured to store a computer program or instructions, and the processor is configured to execute the computer program or the instructions in the memory. If the communication apparatus is a source donor node or a chip of the source donor node, the communication apparatus performs the method according to any one of the first aspect or the possible implementations of the first aspect; or if the communication apparatus is a target donor node or a chip of the target donor node, the communication apparatus performs the method according to the second aspect or the possible implementations of the second aspect; or if the communication apparatus is an IAB node or a chip of the IAB node, the communication apparatus performs the method according to any one of the third aspect or the possible implementations of the third aspect.

According to an eighth aspect of this application, a computer-readable storage medium is provided. The computer-readable storage medium is configured to store a computer program; and when the computer program is run on a computer, the computer is enabled to perform the method according to any one of the first aspect or the possible implementations of the first aspect, or the computer is enabled to perform the method according to any one of the second aspect or the possible implementations of the second aspect, or the computer is enabled to perform the method according to any one of the third aspect or the possible implementations of the third aspect.

According to a ninth aspect of this application, a chip is provided. The chip includes a processor and a communication interface. The processor is configured to read instructions to perform the method according to any one of the first aspect or the possible implementations of the first aspect, or perform the method according to any one of the second aspect or the possible implementations of the second aspect, or perform the method according to any one of the third aspect or the possible implementations of the third aspect.

According to a tenth aspect of this application, a network apparatus is provided. The network apparatus includes a processor. The processor is connected to a memory, the memory is configured to store a computer program, and the processor is configured to execute the computer program stored in the memory, so that the network apparatus performs the method according to any one of the first aspect or the possible implementations of the first aspect, or performs the method according to any one of the second aspect or the possible implementations of the second aspect, or performs the method according to any one of the third aspect or the possible implementations of the third aspect.

According to an eleventh aspect of this application, a communication system is provided. The communication system includes the source donor node according to any one of the first aspect or the possible implementations of the first aspect, the target donor node according to any one of the second aspect or the possible implementations of the second aspect, and the IAB node according to any one of the third aspect or the possible implementations of the third aspect.

DESCRIPTION OF EMBODIMENTS

Figure 1:
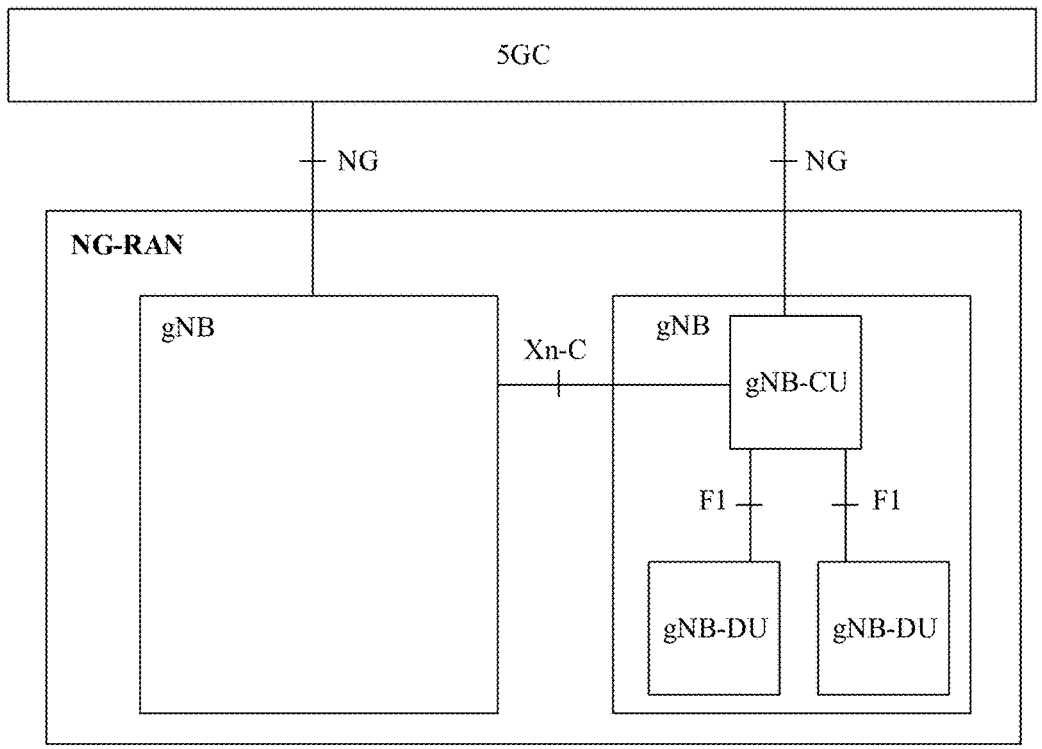
FIG. 1 is a schematic diagram of an architecture in which a gNodeB (gNB)-centralized unit CU and a gNB-distributed unit (DU) are split in an existing communication system.

The following description describes technical solutions in embodiments of the present disclosure with reference to accompanying drawings in embodiments of the present disclosure. It is clear that the described embodiments are merely a part rather than all of embodiments of the present disclosure. All other embodiments obtained by a person skilled in the art based on embodiments of the present disclosure shall fall within the protection scope of the present disclosure.

In the specification, claims, and accompanying drawings of the present disclosure, the terms "first", "second", "third", "fourth", and so on (if any) are intended to distinguish between similar objects but do not necessarily indicate a specific order or sequence. It should be understood that data used in such a way are interchangeable in appropriate circumstances, so that embodiments described herein can be implemented in other orders than the content illustrated or described herein.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

The term "and/or" in this application describes only an association relationship of associated objects and represents that three relationships may exist. For example, A and/or B may represent the following three cases: Only A exists, both A and B exist, and only B exists, where A and B may be singular or plural. In addition, in descriptions of this application, unless otherwise specified, "a plurality of" means two or more than two. The term "at least one of the following items (pieces)" or a similar expression thereof means any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

The technical solutions in embodiments of this application may be applied to various communication systems, for example, a long term evolution (LTE) system, an LTE frequency division duplex (FDD) system, an LTE time division duplex (TDD) system, a 5th generation (5G) system, namely, a new radio (NR) system, and a future mobile communication system.

The following explains and describes some terms in embodiments of this application, to help a person skilled in the art have a better understanding.

gNodeB (gNB): is a node that provides NR user plane and control plane transmission for a terminal device, and includes one or more cells. The gNB is connected to a 5G core network (5GC) through a next generation (NG) interface, and is connected to another gNB through an Xn interface. Control plane signaling between two gNBs is transmitted through an Xn-control plane (Xn-C) interface, and user plane data between two gNBs is transmitted through an Xn-user plane (Xn-U) interface. An interface between the gNB and the terminal device is referred to as a Uu interface.

gNB-central unit (gNB-CU): is a logical node, includes a radio resource control (RRC) layer, a service data adaptation protocol (SDAP) layer, and a packet data convergence protocol (PDCP) layer of the gNB, or includes an RRC layer and/or a PDCP layer of an en-gNB, and controls one or more gNB-distributed units (gNB-DUs).

gNB-Distributed Unit (DU): is a logical node, and includes a radio link control (RLC) layer, a medium access control (MAC) layer, and a physical (PHY) layer of the gNB or the en-gNB. One gNB-DU supports one or more cells, but one cell can belong to only one gNB-DU. In addition, one gNB-DU can be connected to only one gNB-CU.

FIG. 1 is a schematic diagram of an architecture in which a gNB-CU and a gNB-DU are split in an existing communication system.

As shown in FIG. 1, in an existing communication scenario, a gNB may use a centralized unit (CU)-DU split architecture. The gNB includes one gNB-CU and one or more gNB-DUs. The gNB-CU is connected to the gNB-DU through an F1 interface, and the gNB-CU is connected to a 5G core network through an NG interface. In addition, the terminal device accesses the gNB-CU through the gNB-DU. Functions of a peer PHY layer, MAC layer, and RLC layer of the terminal device are located on the gNB-DU, and functions of a peer PDCP layer, SDAP layer, and RRC layer of the terminal device are located on the gNB-CU.

Figure 2:
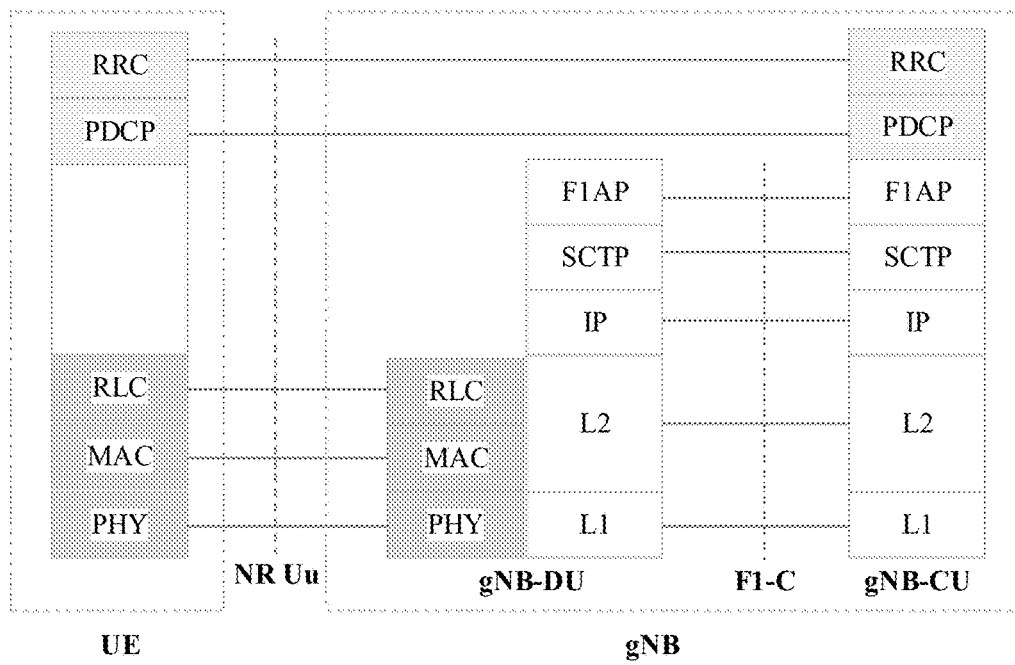
FIG. 2 is a schematic diagram of a control plane protocol stack when a gNB uses a CU-DU split architecture in an existing communication system.

FIG. 2 is a schematic diagram of a control plane protocol stack when a gNB uses a CU-DU split architecture in an existing communication system.

As shown in FIG. 2, for a control plane, in an uplink (UL) direction, a gNB-DU encapsulates, in an F1AP message of an F1 interface, an RRC message generated by a terminal device, and sends the F1AP message to a gNB-CU. In a DL direction, the gNB-CU encapsulates an RRC message in an F1AP message, and sends the F1AP message to the gNB-DU. The gNB-DU extracts the RRC message from the F1AP message, maps the RRC message to a signaling radio bearer (SRB) corresponding to a Uu interface, and sends the signaling radio bearer to the terminal device. Optionally, the SRB may be an SRB 0, an SRB 1, or an SRB 2. This is not specifically limited herein.

Figure 3:
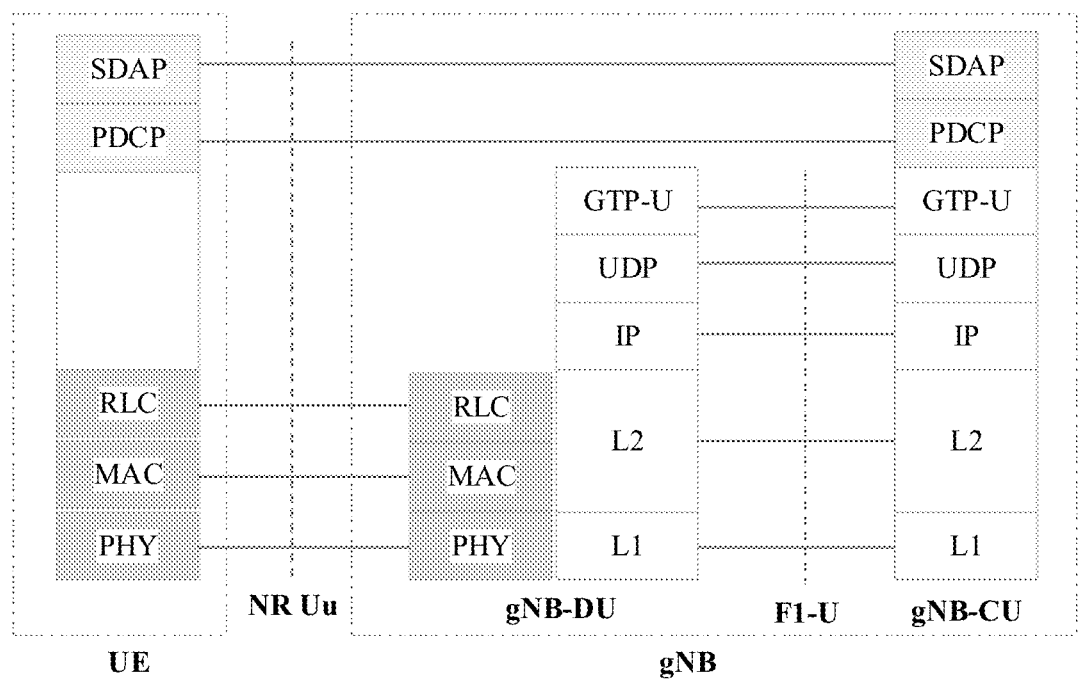
FIG. 3 is a schematic diagram of a user plane protocol stack when a gNB uses a CU-DU split architecture in an existing communication system.

FIG. 3 is a schematic diagram of a user plane protocol stack when a gNB uses a CU-DU split architecture in an existing communication system.

As shown in FIG. 3, for a user plane, in a UL direction, a gNB-DU maps, to a corresponding general packet radio services (GPRS) tunneling protocol (GTP) tunnel, a data packet that is sent by a terminal device and that is received on a data radio bearer (DRB) of a Uu interface, and sends the tunnel to a gNB-CU. In a downlink (DL) direction, the gNB-CU maps a data packet of the terminal device to a corresponding GTP tunnel, and sends the data packet to the gNB-DU. The gNB-DU extracts the data packet of the terminal device from the GTP tunnel, maps the data packet of the terminal device to a DRB corresponding to a Uu interface, and sends the data packet to the terminal device.

In an existing communication technology, concepts of an IAB node and an IAB donor node are introduced. The IAB donor may be a gNB or an upgraded gNB.

Figure 4:
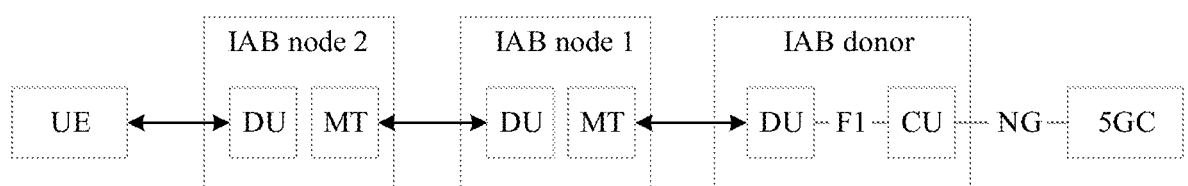
FIG. 4 is a schematic diagram of a two-hop data backhaul scenario in an existing communication system.

FIG. 4 is a schematic diagram of a two-hop data backhaul scenario in an existing communication system.

A two-hop data backhaul (BH) scenario is used as an example. As shown in FIG. 4, in an IAB network, a CU-DU split architecture is used. To be specific, an IAB donor includes two parts: an integrated access and backhaul donor central unit (IAB donor-CU) and an integrated access and backhaul donor distributed unit (IAB donor-DU), and an IAB node includes an integrated access and backhaul node-mobile terminal (IAB-MT) and an integrated access and backhaul donor-distributed unit (IAB-DU). The IAB-MT may also be referred to as IAB-user equipment (UE).

For the IAB donor, the donor-DU has a function similar to that of a gNB-DU, and the donor-CU has a function similar to that of a gNB-CU.

For the IAB node, the IAB-DU has a function similar to that of the gNB-DU, and is configured to provide an access service for a child node of the IAB node. The child node of the IAB node may be a terminal device, or may be another IAB node. The IAB-MT has a function of the terminal device, and is configured to provide data backhaul for the child node of the IAB node.

The IAB node may be further classified into an access IAB node and an intermediate IAB node. The IAB node accessed by the terminal device is referred to as the access IAB node, and the IAB node on a path between the access IAB node and the IAB donor is referred to as the intermediate IAB node.

As shown in FIG. 4, if the terminal device accesses an IAB node 2, the terminal device is referred to as a child node of the IAB node 2, and the IAB node 2 is referred to as an access IAB node or a parent node of the terminal device. This is not limited herein. A link between the terminal device and the IAB node 2 is referred to as an access link. The IAB node 2 is connected to the IAB donor through an IAB node 1. A previous hop of the IAB node 2 was the IAB node 1. That is, a parent node of the IAB node 2 is the IAB node 1, and a child node of the IAB node 1 is the IAB node 2. The IAB node 1 is referred to as an intermediate IAB node. A previous-hop node of the IAB node 1 is the IAB donor. To be specific, a parent node of the IAB node 1 is the IAB donor, and a child node of the IAB donor is the IAB node 1. A link between the IAB node 1 and the IAB node 2 and a link between the IAB node 1 and the IAB donor are all referred to as backhaul links. A peer PHY layer, MAC layer, and RLC layer of the terminal device are located on the access IAB node, that is, on an IAB2-DU, and a peer PDCP layer, SDAP layer, and RRC layer of the terminal device are located on the IAB donor-CU. The IAB node uses an L2 data forwarding architecture, and a specific control plane protocol stack and a specific user plane protocol stack are separately described below.

Figure 5:
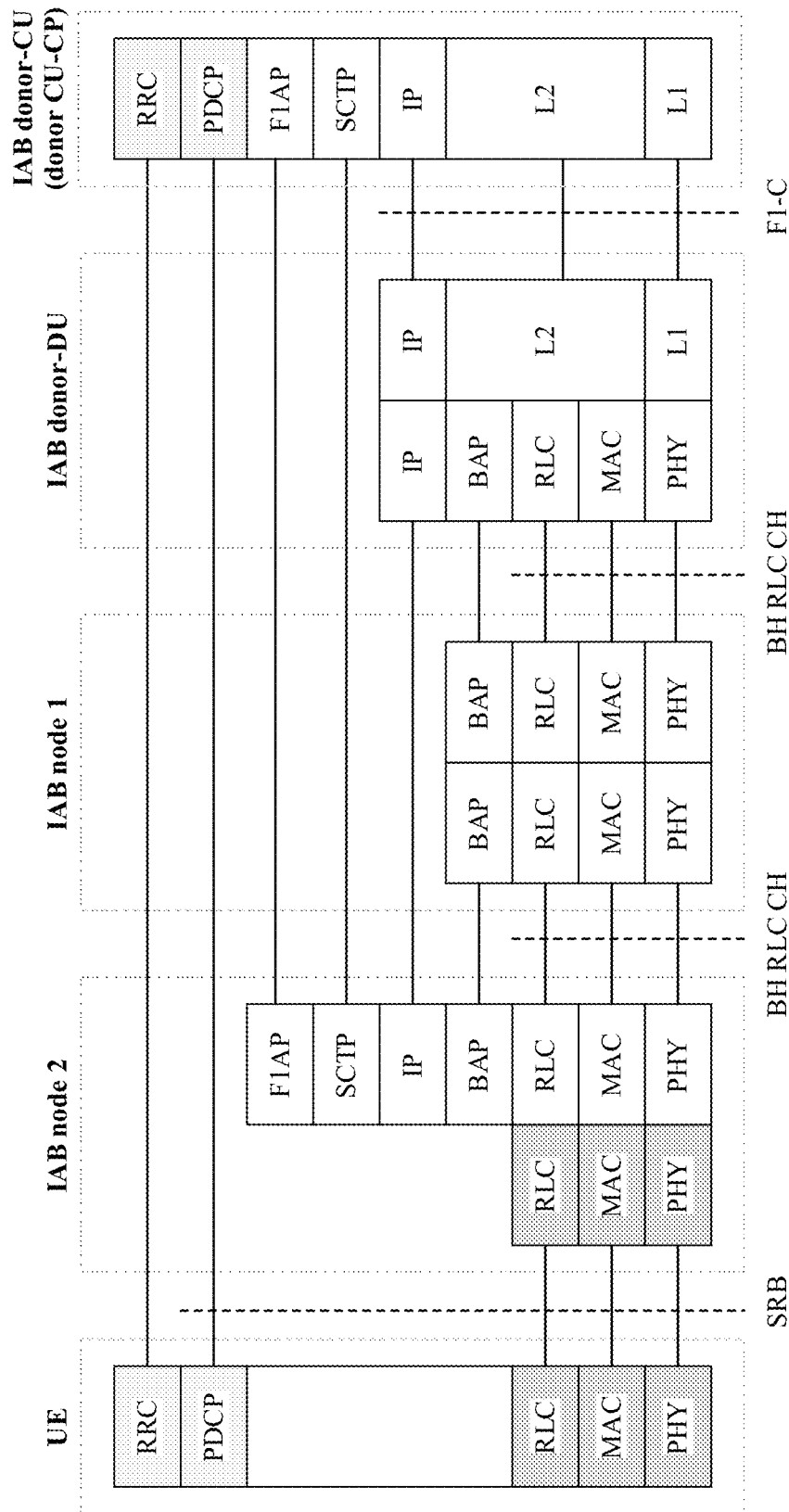
FIG. 5 is a schematic diagram of a control plane protocol stack for two-hop data backhaul.

FIG. 5 is a schematic diagram of a control plane protocol stack for two-hop data backhaul.

As shown in FIG. 5, in a control plane protocol stack, an F1-control plane (F1-C) interface is set up between an IAB2-DU and a donor CU-CP. Specifically, if a donor-CU uses a control plane-user plane (CP-UP) split architecture, the F1-C interface is set up between the IAB2-DU and the donor CU-CP. An RRC message of a terminal device is encapsulated into an F1AP message and transmitted through an F1-C interface.

Figure 6:
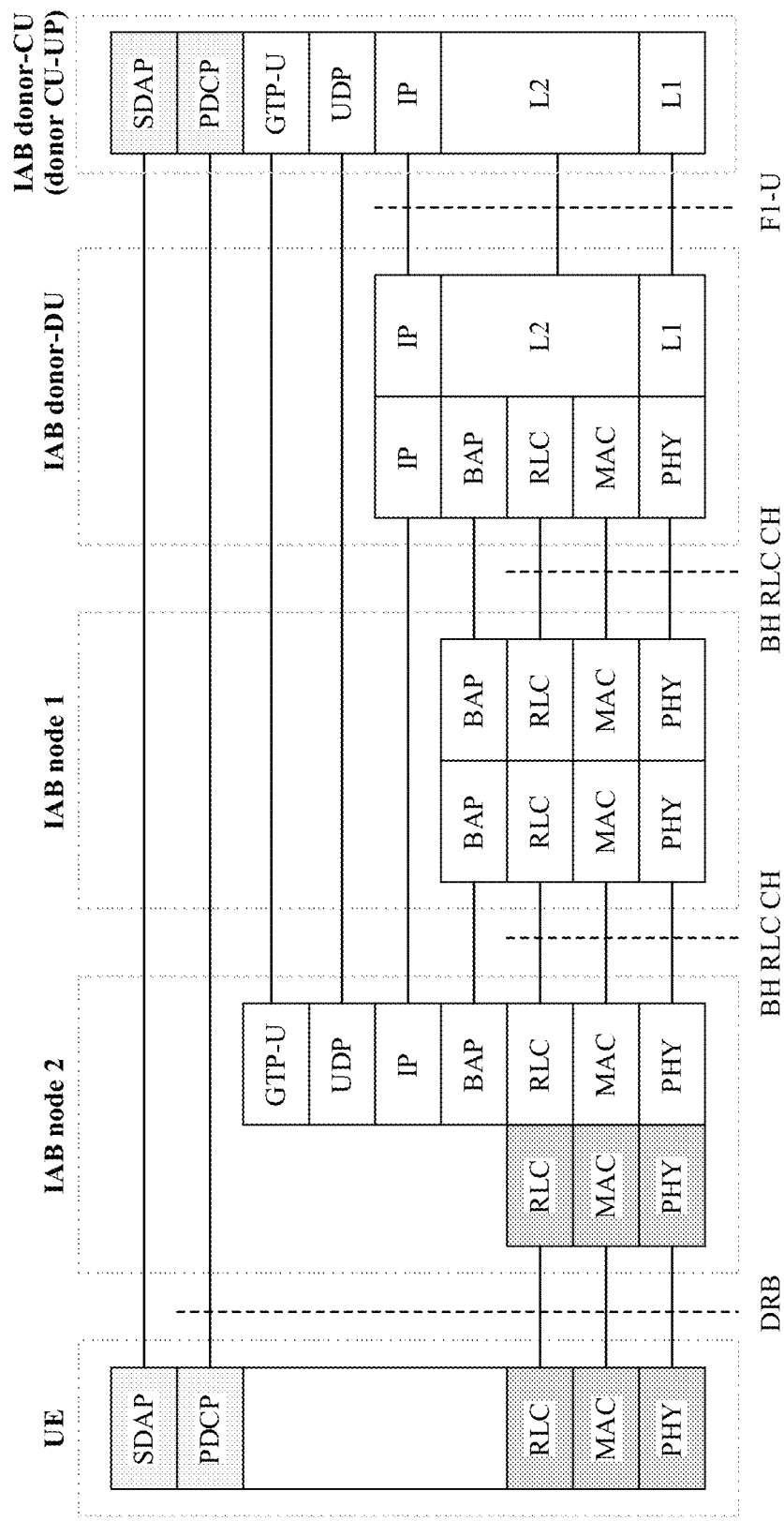
FIG. 6 is a schematic diagram of a user plane protocol stack for two-hop data backhaul.

FIG. 6 is a schematic diagram of a user plane protocol stack for two-hop data backhaul.

As shown in FIG. 6, in a user plane protocol stack, an F1-user plane (F1-U) interface is set up between an IAB2-DU and a donor CU-UP. Specifically, if a donor-CU uses a CP-UP split architecture, the F1-U interface is set up between the IAB2-DU and the donor CU-UP, and a GTP tunnel per UE bearer is set up on the F1-U interface. That is, each UE DRB set up on an interface between UE and the IAB2-DU corresponds to a separate GTP tunnel on the interface between the IAB2-DU and the donor CU-UP.

According to a protocol standard for a 5th generation cellular mobile communication system formulated by the 3rd Generation Partnership Project (3GPP) standard organization, compared with a LTE system, a NR system supports a larger transmission bandwidth, more transceiver antenna arrays, a higher transmission rate, and a more flexible and smaller-granularity scheduling mechanism. The foregoing features extend application scopes for the NR system.

In an existing NR system, a terminal device exchanges data with an IAB donor node in an IAB scenario. There is at least one IAB node between the terminal device and the IAB donor node, and the terminal device sets up a communication connection to the IAB donor node through the at least one IAB node.

When the IAB node is handed over the IAB donor node, in a conventional technology, only the IAB-MT in the IAB node may be handed over from a source donor node to a target donor node, but processing of the IAB-DU in the IAB node and a child node (for example, the terminal device or another IAB node) of the IAB node is not involved. Consequently, the child node of the IAB node cannot normally operate after the IAB node is handed over.

For the foregoing problem, this application provides a node handover method and a related device. A source donor node sends a handover request message to a target donor node, where the handover request message includes context information of an IAB node and context information of at least one terminal device. The source donor node receives a handover response message sent by the target donor node, where the handover response message includes an identifier of an accepted terminal device in the at least one terminal device and/or an identifier of a rejected terminal device in the at least one terminal device. In this way, the terminal device that is in the at least one terminal device connected to the IAB node and that is accepted by the target donor node is handed over to the target donor node. For terminal devices rejected by the target donor node, the source donor node reselects a handover target node for the rejected terminal devices. Therefore, the IAB node and the accepted terminal device are handed over to the target donor node together, to ensure normal transmission of data of the accepted terminal device, and the rejected terminal device is handed over to the target node to which the terminal device is allowed to be handed over. In this way, normal transmission of data of the rejected terminal device is also ensured.

Figure 7:
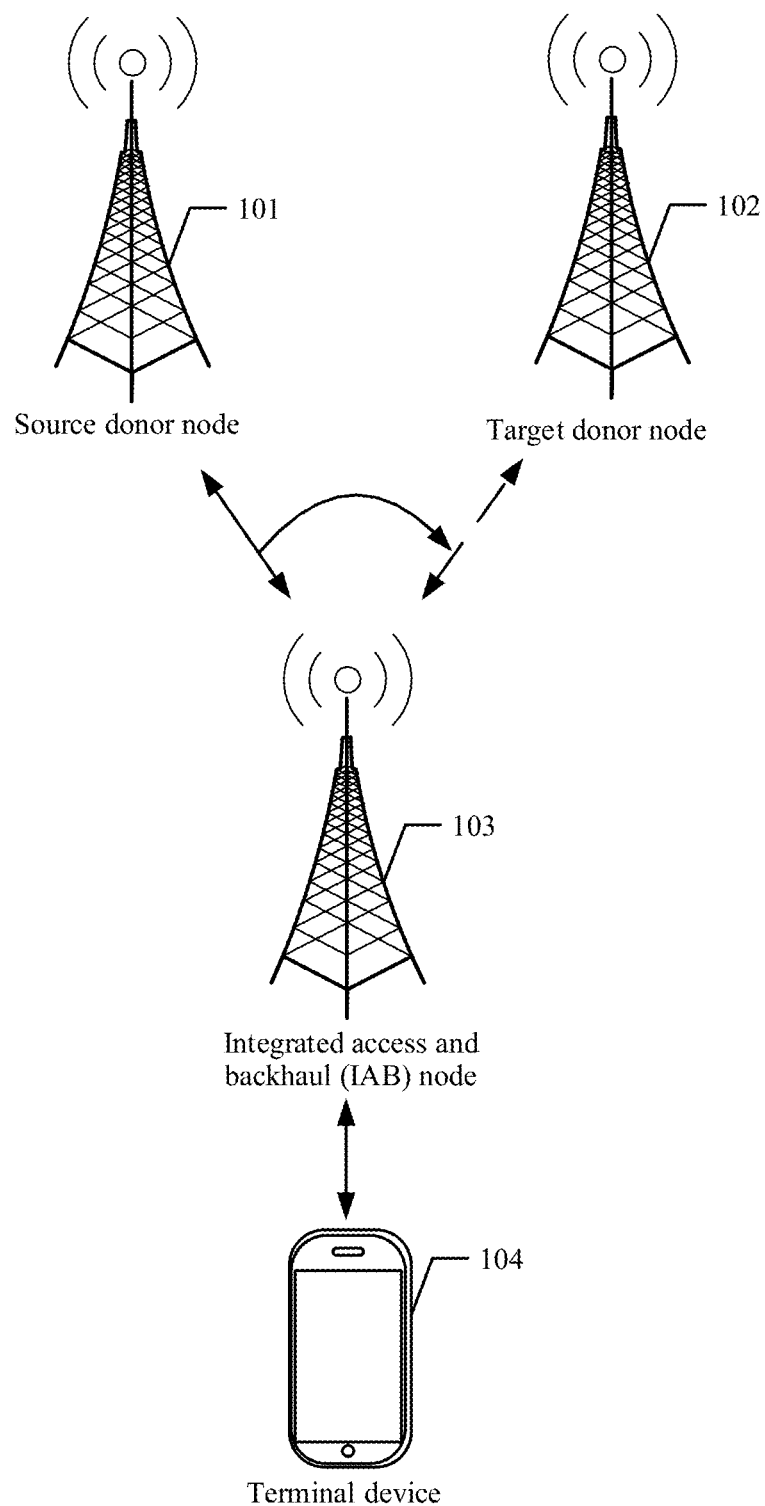
FIG. 7 is a schematic diagram of an application scenario of a node handover system according to this application.

FIG. 7 is a schematic diagram of an application scenario of a node handover system according to this application.

Refer to FIG. 7. In some embodiments, a source donor node 101, a target donor node 102, an IAB node 103, and a terminal device 104 form a node handover system. In some embodiments, a single-hop backhaul link is used as an example for description. However, the solution in some embodiments is also applicable to two-hop and multi-hop backhaul link scenarios. This is not specifically limited herein.

Before the IAB node 103 performs node handover, the terminal device 104 accesses the IAB node 103, and is connected to the source donor node 101 through the IAB node 103. After the IAB node 103 performs node handover, the IAB node 103 is handed over from the source donor node 101 to the target donor node 102, and the terminal device 104 is connected to the target donor node 102 through the IAB node 103.

In some embodiments, the source donor node is short for a source IAB donor node, and the target donor node is short for a target IAB donor node. Optionally, the source donor node and the target donor node may be gNBs, or the source donor node and the target donor node may be other devices. This is not limited herein.

The terminal device in some embodiments may be a device that provides voice and/or data connectivity for a user, a handheld device with a wireless connection function, or another processing device connected to a wireless modem. The terminal device may be a mobile terminal, for example, a mobile phone (or referred to as a "cellular" phone), and a computer that has a mobile terminal. For example, the terminal device may be a portable, pocket-size, handheld, computer built-in, or vehicle-mounted mobile apparatus, which exchanges a voice and/or data with a network device. For example, the terminal device is a device such as a personal communication service (PCS) phone, a cordless phone, a session initiation protocol (SIP) phone, a wireless local loop (WLL) station, or a personal digital assistant (PDA). The terminal device may also be referred to as a system, a subscriber unit, a subscriber station, a mobile station, a mobile station, a remote station, an access point, a remote terminal, an access terminal, a user agent, a user device or user equipment, a user station, a remote station, a terminal equipment (TE), a terminal, a wireless communication device, and a user agent or user apparatus. In addition, the terminal device may alternatively be a chip system configured to implement a function of UE. This is not limited herein.

In the handover system provided in some embodiments, only a topology relationship between one terminal device and one IAB node is used as an example for description. The handover system may further include more terminal devices and more IAB nodes. This is not limited herein.

Figure 8:
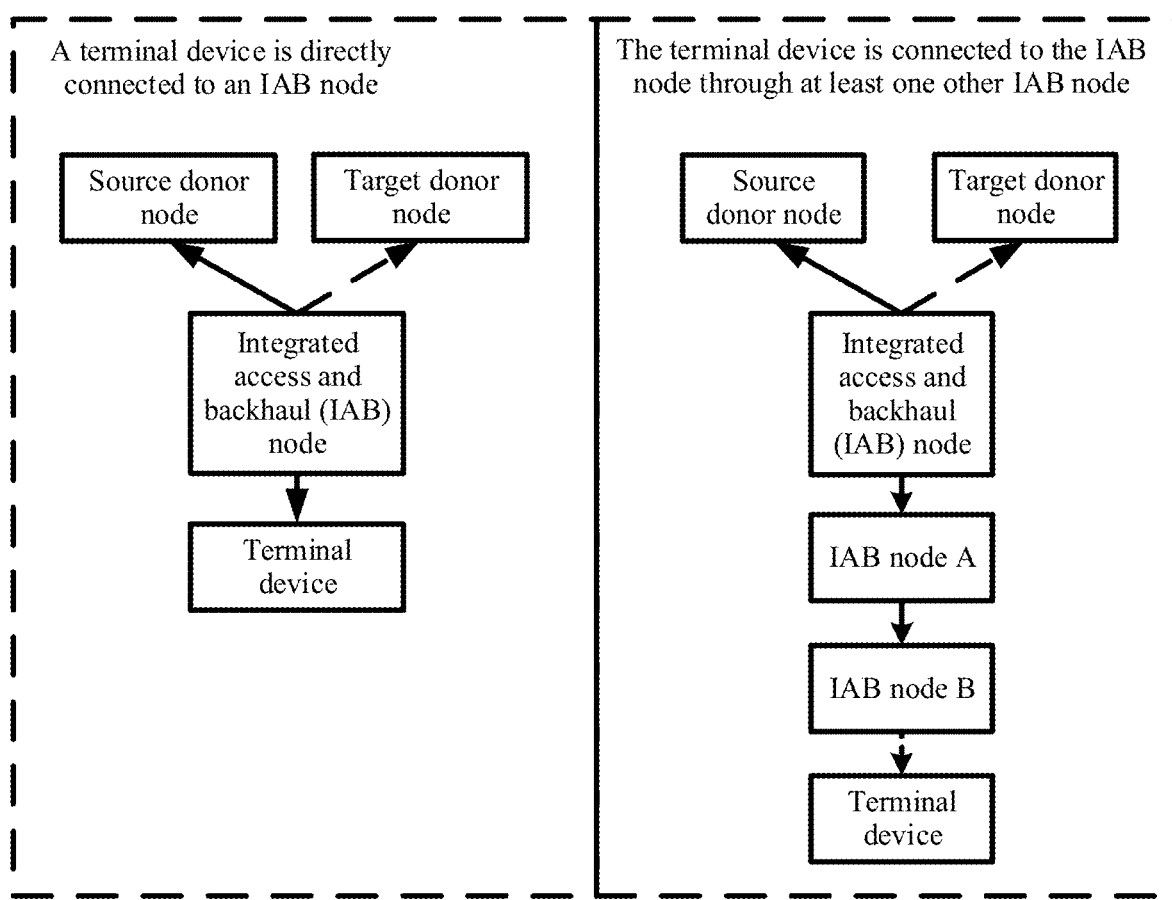
FIG. 8 is a schematic diagram of an embodiment of a node handover system according to this application.

FIG. 8 is a schematic diagram of an embodiment of a node handover system according to this application.

Refer to FIG. 8. In the handover system provided in this application, optionally, a terminal device may be directly connected to an IAB node. Alternatively, the terminal device may be connected to the IAB node through another IAB node such as an IAB node A or an IAB node B. This is not specifically limited herein.

Figure 9:
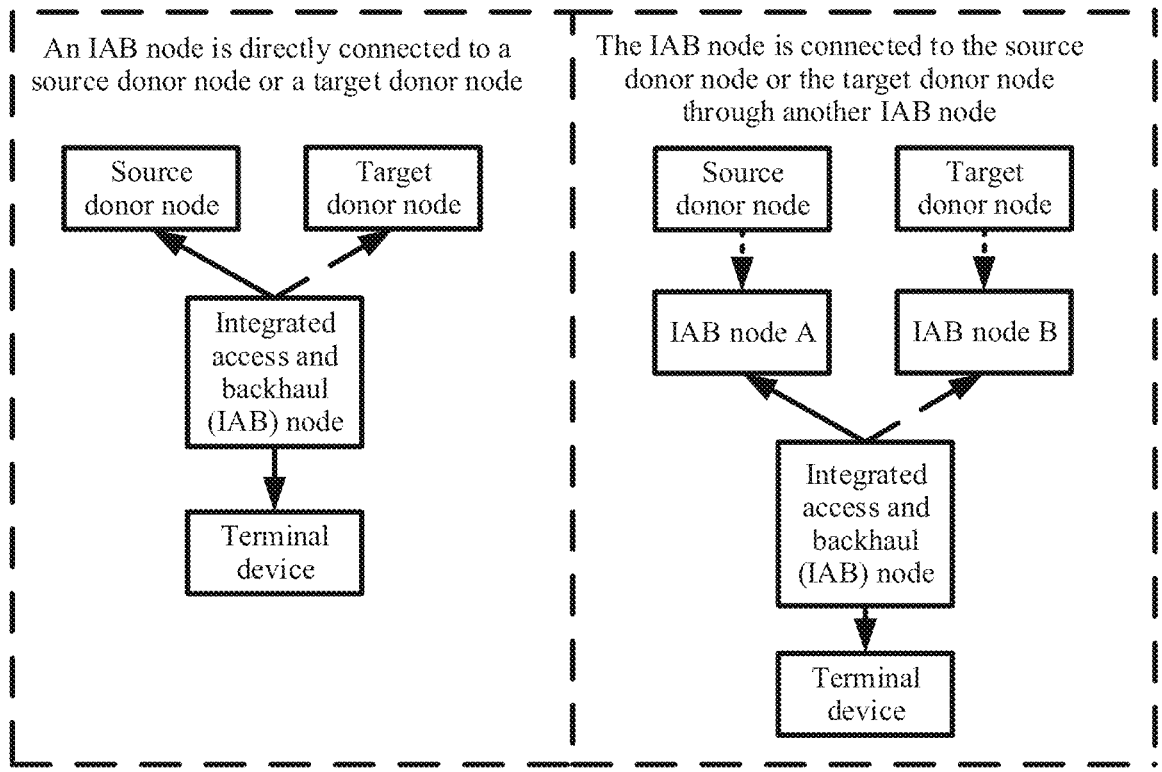
FIG. 9 is a schematic diagram of another embodiment of a node handover system according to this application.

FIG. 9 is a schematic diagram of an embodiment of a node handover system according to this application.

Refer to FIG. 9. In the handover system provided in this application, an example in which a terminal device is directly connected to an IAB node is used for description. Optionally, the IAB node may be directly connected to a source donor node or a target donor node. Alternatively, the IAB node may be connected to the source donor node through at least one IAB node such as an IAB node A, or the IAB node may be connected to the target donor node through at least one IAB node such as an IAB node B. This is not limited herein.

In the handover system provided in this application, the IAB node described in the following embodiments may be an IAB node that triggers handover. The IAB node that triggers handover may be referred to as a handover IAB node (e.g., migrating IAB node), and another IAB node is a next-hop child node, a multi-hop grandchild node, or a great-grandchild node of the IAB node (e.g., handover IAB node). This is not limited herein. Optionally, the terminal device may be directly connected to the handover IAB node. Alternatively, the terminal device may be connected to the handover IAB node through the other IAB node such as the IAB node A or the IAB node B. Optionally, before handover, the handover IAB node may be directly connected to the source donor node, or the handover IAB node may be further connected to the source donor node through at least one IAB node such as an IAB node C. After handover, the handover IAB node may be directly connected to the target donor node, or the handover IAB node may be connected to the target donor node through at least one IAB node such as an IAB node D. That is, the solutions shown in FIG. 8 and FIG. 9 may be combined with each other. This is not limited herein.

Based on the node handover system described in FIG. 7 to FIG. 9, a node handover method provided in this application is described.

Figure 10:
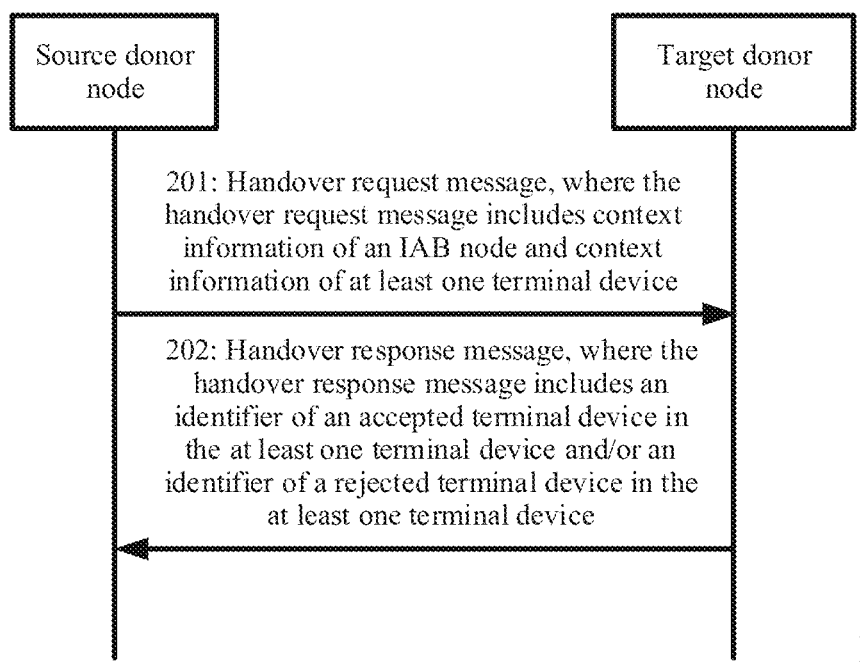
FIG. 10 is a schematic diagram of an embodiment of a node handover method according to this application.

FIG. 10 is a schematic diagram of an embodiment of a node handover method according to this application.

Refer to FIG. 10. An embodiment of a node handover method provided in this application includes step 201 and step 202.

201: A source donor node sends a handover request message to a target donor node, and the target donor node receives the handover request message sent by the source donor node.

In some embodiments, the handover request message requests to hand over an IAB node and at least one terminal device to the target donor node. The handover request message includes context information of the IAB node and context information of the at least one terminal device.

Optionally, in a possible implementation, the source donor node sends a handover request message to the target donor node. If the terminal device is directly connected to the IAB node, the handover request message includes the context information of the IAB node and the context information of the at least one terminal device. If the terminal device is connected to the IAB node through at least one other IAB node, the handover request message further includes context information of the other IAB node.

Optionally, in another possible implementation, the source donor node sends a plurality of handover request messages to the target donor node, where each handover request message includes context information of one node. If the terminal device is directly connected to the IAB node, that is, the context information of the IAB node is carried in an individual handover request message, context information of one terminal device is carried in an individual handover request message, and context information of different terminal devices is carried in different handover request messages. If the terminal device is connected to the IAB node through at least one other IAB node, the context information of the IAB node and the context information of the at least one terminal device are separately carried in an individual handover request message, a context of one other IAB node is also carried in an individual handover request message, and contexts of different other IAB nodes are carried in different handover request messages.

After receiving the handover request message, the target donor node determines, based on a network load status and the like of the target donor node, whether to accept handover of the IAB node and the at least one terminal device together if the terminal device is directly connected to the IAB node; or determines whether to accept handover of the IAB node, the at least one other IAB node, and the at least one terminal device together if the terminal device is connected to the IAB node through the at least one other IAB node.

202: The source donor node receives a handover response message sent by the target donor node, and the target donor node sends the handover response message to the source donor node.

In some embodiments, the handover response message includes an identifier of an accepted terminal device in the at least one terminal device and/or an identifier of a rejected terminal device in the at least one terminal device.

Optionally, in a possible implementation, if the source donor node sends a handover request message to the target donor node, the target donor node sends a handover response message to the source donor node. If the terminal device is directly connected to the IAB node, the handover response message includes the identifier of the accepted terminal device in the at least one terminal device and/or the identifier of the rejected terminal device in the at least one terminal device. If the terminal device is connected to the IAB node through the at least one other IAB node, the handover response message further includes an identifier of another accepted IAB node in the at least one other IAB node and/or an identifier of another rejected IAB node in the at least one other IAB node.

Optionally, in another possible implementation, if the source donor node sends a plurality of handover request messages to the target donor node, the target donor node sends a plurality of handover response messages to the source donor node, and each handover response message corresponds to one node. If the terminal device is directly connected to the IAB node, that is, the IAB node corresponds to an individual handover response message, one terminal device corresponds to an individual handover response message, and different terminal devices correspond to different handover response messages. A handover response message corresponding to the accepted terminal device includes the identifier of the accepted terminal device. A handover response message corresponding to the rejected terminal device is a handover rejection message, a handover preparation failure message, or a handover failure message, and the message includes the identifier of the rejected terminal device. Optionally, the message further includes a reason for rejection. If the terminal device is connected to the IAB node through the at least one other IAB node, that is, the IAB node and the at least one terminal device each correspond to an individual handover response message, one other IAB node also corresponds to an individual handover response message, and different other IAB nodes correspond to different handover response messages. A handover response message corresponding to the other accepted IAB node includes the identifier of the other accepted IAB node. A handover response message corresponding to the other rejected IAB node is a handover rejection message, a handover preparation failure message, or a handover failure message, and the message includes the identifier of the other rejected IAB node. Optionally, the message further includes a reason for rejection. The reason for rejection may be that because resources of the target donor node are insufficient, network load of the target donor node cannot bear all other IAB nodes that request handover or all terminal devices that request handover. The reason for rejection may alternatively be that because a node identifier (for example, a UE XnAP ID) sent by the source donor node is unavailable, the target donor node cannot identify the node identifier sent by the source donor node. The reason for rejection may be another reason. This is not limited herein.

In some embodiments, in addition to step 201 and step 202, before the source donor node sends the handover request message to the target donor node, the source donor node further receives a measurement result sent by the IAB node. This step is described in detail in the following embodiments.

Scenario 1: It is assumed that the terminal device is directly connected to the IAB node.

The source donor node receives the measurement result sent by the IAB node.

The measurement result includes a result A of measuring, by the IAB node, signal quality of a serving cell managed by the source donor node and a result B of measuring, by the IAB node, signal quality of a neighboring cell managed by the target donor node. Optionally, the measurement result includes reference signal received power (RSRP) and/or reference signal received quality (RSRQ). This is not limited herein.

The source donor node determines, based on the measurement result, to hand over the IAB node and the at least one terminal device to the target donor node.

If the source donor node determines that the result A is better than the result B, it can be learned that the signal quality of the serving cell is better than that of the neighboring cell, and the source donor node does not need to send the handover request message to the target donor node. If the IAB node does not operate in a carrier aggregation (CA) mode, there is one serving cell. If signal quality B of one neighboring cell is higher than signal quality A of the serving cell, the source donor node determines, based on the measurement result, to hand over the IAB node and the at least one terminal device to the target donor node. If the IAB node operates in a CA mode, the serving cell includes one primary cell and at least one secondary cell. If signal quality B of one neighboring cell is higher than signal quality A of the primary cell, the source donor node determines, based on the measurement result, to hand over the IAB node and the at least one terminal device to the target donor node.

Optionally, the source donor node uses the IAB node and the at least one terminal device as a group, and hands over all members in the group to the target donor node. If the source donor node sends a plurality of handover request messages to the target donor node, the source donor node further needs to send indication information to the target donor node, where the indication information indicates a quantity of members in the group, so that the target donor node determines a quantity of to-be-received handover request messages, that is, one member corresponds to one handover request message.

Scenario 2: It is assumed that the terminal device is connected to the IAB node through the at least one other IAB node.

The source donor node receives the measurement result sent by the IAB node.

The measurement result includes a result A of measuring, by the IAB node, signal quality of a serving cell managed by the source donor node and a result B of measuring, by the IAB node, signal quality of a neighboring cell managed by the target donor node. Optionally, the measurement result includes RSRP and/or RSRQ. This is not limited herein.

The source donor node determines, based on the measurement result, to hand over the IAB node, the at least one other IAB node, and the at least one terminal device to the target donor node.

If the source donor node determines that the result A is better than the result B, it can be learned that the signal quality of the serving cell is better than that of the neighboring cell, and the source donor node does not need to send the handover request message to the target donor node. If the IAB node does not operate in a CA mode, there is one serving cell. If signal quality B of one neighboring cell is higher than signal quality A of the serving cell, the source donor node may determine, based on the measurement result, to hand over the IAB node, the at least one other IAB node, and the at least one terminal device to the target donor node. If the IAB node operates in a CA mode, the serving cell includes one primary cell and at least one secondary cell. If signal quality B of one neighboring cell is higher than signal quality A of the primary cell, the source donor node may determine, based on the measurement result, to hand over the IAB node, the at least one other IAB node, and the at least one terminal device to the target donor node.

Optionally, the source donor node uses the IAB node, the at least one other IAB node, and the at least one terminal device as a group, and hands over all members in the group to the target donor node. If the source donor node sends a plurality of handover request messages to the target donor node, the source donor node further sends indication information to the target donor node, where the indication information indicates a quantity of members in the group, so that the target donor node determines a quantity of to-be-received handover request messages, that is, one member corresponds to one handover request message.

In some embodiments, the context information of the IAB node and the context information of the other IAB node include a plurality of different parameters, which are described in the following embodiments.

In some embodiments, the IAB node includes an IAB-MT and an IAB-DU, the context information of the IAB node includes context information of the IAB-MT and context information of the IAB-DU, the context information of the IAB-MT includes configuration information of a backhaul radio link control channel (BH RLC CH) between the IAB-MT and a parent node of the IAB node, and the context information of the IAB-DU includes an identifier of the IAB-DU and/or an identifier of a cell served by the IAB-DU. Optionally, the context information of the IAB-DU may further include activation indication information of a cell served by the IAB-DU, where the activation indication information indicates whether the cell served by the IAB- DU has been activated, and each cell served by the IAB-DU corresponds to one piece of individual activation indication information. Optionally, the context information of the IAB node further includes a backhaul adaptation protocol (BAP) address allocated by the source donor node to the IAB node.

In some embodiments, the context information of the terminal device includes an identifier of the terminal device, and the identifier of the terminal device includes a physical cell identifier (PCI) of a cell accessed by the terminal device and an identifier (C-RNTI) of the terminal device in the accessed cell. Specifically, the cell accessed by the terminal device belongs to the source donor node. To be specific, a base station identifier included in the cell identifier of the cell is consistent with a base station identifier of the source donor node.

In some embodiments, the other IAB node includes another IAB-MT and another IAB-DU, the context information of the other IAB node includes context information of the other IAB-MT and context information of the other IAB-DU, the context information of the other IAB-MT includes configuration information of a BH RLC CH between the other IAB-MT and a parent node of the other IAB node, and the context information of the other IAB-DU includes an identifier of the other IAB-DU and/or an identifier of a cell served by the other IAB-DU. Optionally, the context information of the other IAB-DU further includes activation indication information of a cell served by the other IAB-DU, where the activation indication information of the cell served by the other IAB-DU indicates whether the cell served by the other IAB-DU has been activated, and each cell served by the other IAB-DU corresponds to one piece of individual activation indication information. Optionally, the context information of the other IAB node further includes a BAP address allocated by the source donor node to the other IAB node.

In some embodiments, the context information of the IAB node and the context information of the other IAB node further include a topology relationship between the IAB node, the other IAB node, and the terminal device. A specific implementation is described in the following embodiments.

Scenario 1: It is assumed that the terminal device is directly connected to the IAB node.

Manner 1: The context information of the IAB node further includes an identifier of a child node (or a next-hop node) of the IAB node, and indicates a topology relationship between the IAB node and the child node (or the next-hop node) of the IAB node. The terminal device is directly connected to the IAB node. In this case, the child node (or the next-hop node) of the IAB node is the terminal device, and the identifier of the child node (or the next-hop node) of the IAB node is the identifier of the terminal device. For example, the identifier of the terminal device may be a user equipment Xn application protocol identity (UE XnAP ID). This is not limited herein.

Optionally, the context information of the terminal device may further include an identifier of a parent node (or a previous-hop node) of the terminal device, and indicates a topology relationship between the terminal device and the parent node (or the previous-hop node) of the terminal device. The terminal device is directly connected to the IAB node. In this case, the parent node (or the previous-hop node) of the terminal device is the IAB node, and the identifier of the parent node (or the previous-hop node) of the terminal device is an identifier of the IAB node. For example, the identifier of the IAB node may be a UE XnAP ID, or may be a BAP address of the IAB node. This is not limited herein.

Manner 2: The context information of the IAB node may further include network topology list information. Because the terminal device is directly connected to the IAB node, the network topology list information indicates a topology relationship between the IAB node and the terminal device. For example, if the terminal device is connected to the IAB node, the network topology list information includes an identifier of the IAB node and an identifier of a child node (or a next-hop node) of the IAB node (namely, the identifier of the terminal device), or the network topology list information includes the identifier of the terminal device and an identifier of a parent node (or a previous-hop node) of the terminal device (namely, an identifier of the IAB node). The identifier of the terminal device may be a UE XnAP ID, and the identifier of the IAB node may also be a UE XnAP ID or a BAP address. This is not specifically limited herein.

Optionally, the network topology list information may not be carried in the context information of the IAB node, but is directly carried in the handover request message sent by the source donor node to the target donor node. This is not limited herein.

In some embodiments, based on the handover request message sent by the source donor node, the target donor node may obtain the topology relationship between the IAB node and the terminal device. In addition to the implementations mentioned in Manner 1 and Manner 2 in the foregoing embodiments, the target donor node may obtain the topology relationship between the IAB node and the terminal device in another manner. This is not limited herein.

Scenario 2: It is assumed that the terminal device accesses the IAB node through the at least one other IAB node, Manner 1: The context information of the IAB node further includes an identifier of a child node (or a next-hop node) of the IAB node, and indicates a topology relationship between the IAB node and the child node (or the next-hop node) of the IAB node. The terminal device is connected to the IAB node through the at least one other IAB node. In this case, the child node (or the next-hop node) of the IAB node is the other IAB node, and the identifier of the child node (or the next-hop node) of the IAB node is an identifier of the other IAB node. For example, the identifier of the other IAB node may be a UE XnAP ID, or may be a BAP address of the other IAB node. This is not limited herein.

Optionally, the context information of the other IAB node further includes an identifier of a parent node (or a previous-hop node) of the other IAB node, and/or an identifier of a child node (or a next-hop node) of the other IAB node, and indicates a topology relationship between the other IAB node and the parent node (or the previous-hop node) of the other IAB node, and/or a topology relationship between the other IAB node and the child node (or the next-hop node) of the other IAB node. The terminal device is connected to the IAB node through the at least one other IAB node, for example, the terminal device is connected to the IAB node through an IAB node A. In this case, the other IAB node is the IAB node A, the parent node (or the previous-hop node) of the other IAB node is the IAB node, and the identifier of the parent node (or the previous-hop node) of the other IAB node is an identifier of the IAB node. The child node (or the next-hop node) of the other IAB node is the terminal device, and the identifier of the child node (or the next-hop node) of the other IAB node is the identifier of the terminal device. The identifier of the terminal device may be a UE XnAP ID, and the identifier of the IAB node may also be a UE XnAP ID or a BAP address. This is not specifically limited herein.

Optionally, the context information of the terminal device further includes an identifier of a parent node (or a previous-hop node) of the terminal device, and indicates a topology relationship between the terminal device and the parent node (or the previous-hop node) of the terminal device. The terminal device is connected to the IAB node through the at least one other IAB node. In this case, the parent node (or the previous-hop node) of the terminal device is the other IAB node, and the identifier of the parent node (or the previous-hop node) of the terminal device is an identifier of the other IAB node. For example, the identifier of the other IAB node may be a UE XnAP ID, or may be a BAP address of the other IAB node. This is not limited herein.

Manner 2: The context information of the IAB node further includes network topology list information. Because the terminal device is connected to the IAB node through the at least one other IAB node, the network topology list information indicates a topology relationship between the IAB node, the other IAB node, and the terminal device. For example, if the terminal device is connected to the IAB node through an IAB node A, the network topology list information includes two groups of lists. The first group of lists includes an identifier of the IAB node and an identifier of a child node (or a next-hop node) of the IAB node. If the child node of the IAB node is the IAB node A, the identifier of the child node (or the next-hop node) of the IAB node is an identifier of the IAB node A. The second group list includes an identifier of the IAB node A and an identifier of a child node (or a next-hop node) of the IAB node A. If the child node (or the next-hop node) of the IAB node A is the terminal device, the identifier of the child node (or the next-hop node) of the IAB node A is the identifier of the terminal device. Alternatively, the network topology list information includes two groups of lists. The first group of lists includes the identifier of the terminal device and an identifier of a parent node (or a previous-hop node) of the terminal device. If the parent node of the terminal device is the IAB node A, the identifier of the parent node (or the previous-hop node) of the terminal device is an identifier of the IAB node A. The second group of lists includes an identifier of the IAB node A and an identifier of a parent node (or a previous-hop node) of the IAB node A. If the parent node (or the previous-hop node) of the IAB node A is the IAB node, the identifier of the parent node (or the previous-hop node) of the IAB node A is an identifier of the IAB node. The identifier of the terminal device may be a UE XnAP ID, the identifier of the IAB node may also be a UE XnAP ID or a BAP address, and the identifier of the other IAB node (for example, the IAB node A) may also be a UE XnAP ID or a BAP address. This is not limited herein.

Optionally, the network topology list information may not be carried in the context information of the IAB node, but is directly carried in the handover request message sent by the source donor node to the target donor node. This is not limited herein.

In some embodiments, the target donor node obtains the topology relationship between the IAB node, the other IAB node, and the terminal device based on the handover request message sent by the source donor node. In addition to the implementations mentioned in Manner 1 and Manner 2 in the foregoing embodiments, the target donor node may further obtain the topology relationship between the IAB node, the other IAB node, and the terminal device in another manner. This is not limited herein.

Figure 11:
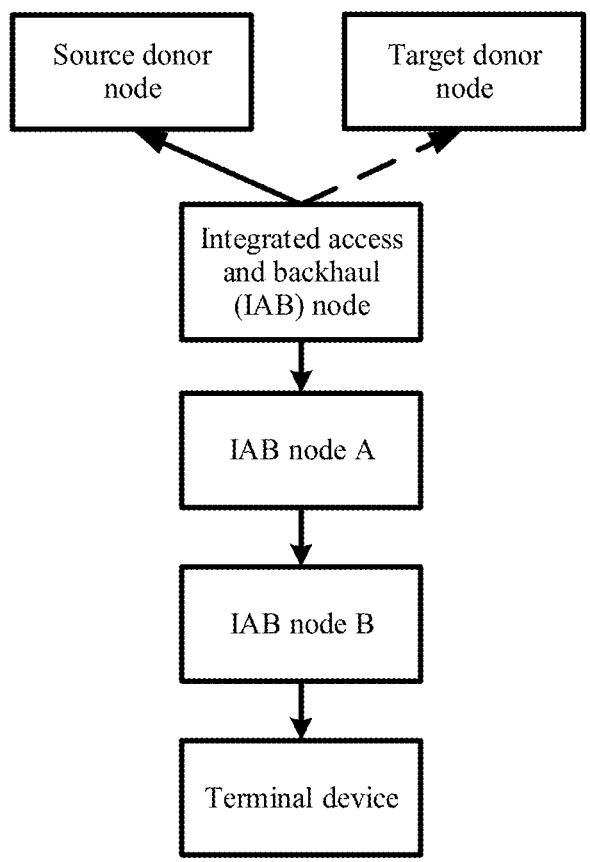
FIG. 11 is a schematic diagram of another embodiment of a node handover method according to this application.

FIG. 11 is a schematic diagram of an embodiment of a node handover method according to this application.

Refer to FIG. 11. For example, a terminal device is connected to an IAB node through an IAB node B and an IAB node A.

Optionally, in a possible implementation, context information of the IAB node includes an identifier of a child node of the IAB node (namely, an identifier of the IAB node A), context information of the IAB node A includes an identifier of a child node of the IAB node A (namely, an identifier of the IAB node B), and context information of the IAB node B includes an identifier of a child node of the IAB node B (namely, an identifier of the terminal device). In this way, a target donor node learns of, based on the context information carried in a handover request message sent by a source donor node to the target donor node, a topology relationship between the IAB node, the IAB node A, the IAB node B, and the terminal device.

Optionally, in another possible implementation, context information of the IAB node A includes an identifier of a parent node of the IAB node A (namely, an identifier of the IAB node), context information of the IAB node B includes an identifier of a parent node of the IAB node B (namely, an identifier of the IAB node A), and context information of the terminal device includes an identifier of a parent node of the terminal device (namely, an identifier of IAB node B). In this way, a target donor node learns of, based on the context information carried in a handover request message sent by a source donor node to the target donor node, a topology relationship between the IAB node, the IAB node A, the IAB node B, and the terminal device.

Optionally, in another possible implementation, context information of the IAB node includes an identifier of a child node of the IAB node (namely, an identifier of the IAB node A), context information of the IAB node A includes an identifier of a parent node of the IAB node A (namely, an identifier of the IAB node) and an identifier of a child node of the IAB node A (namely, an identifier of the IAB node B), a context of the IAB node B includes an identifier of a parent node of the IAB node B (namely, the identifier of the IAB node A) and an identifier of a child node of the IAB node B (namely, an identifier of the terminal device), and context information of the terminal device includes an identifier of a parent node of the terminal device (namely, the identifier of the IAB node B). In this way, a target donor node learns of, based on the context information carried in a handover request message sent by a source donor node to the target donor node, a topology relationship between the IAB node, the IAB node A, the IAB node B, and the terminal device.

Optionally, in the context information of the IAB node and another IAB node, a network topology relationship between the IAB node, the other IAB node, and the terminal device may be described in another implementation by using a node identifier. This is not limited herein.

Optionally, in addition to the context information, topology information may be further carried in the handover request message sent by the source donor node to the target donor node. To be specific, the handover request message sent by the source donor node to the target donor node may further include network topology list information, and the network topology list information indicates the topology relationship between the IAB node, the IAB node A, the IAB node B, and the terminal device. That is, the network topology list information includes three groups of lists. The first group of lists includes the identifier of the IAB node and the identifier of the child node of the IAB node (namely, the identifier of the IAB node A), the second group of lists includes the identifier of the IAB node A and the identifier of the child node of the IAB node A (namely, the identifier of the IAB node B), and the third group of lists includes the identifier of the IAB node B and the identifier of the child node of the IAB node B (namely, the identifier of the terminal device). Alternatively, the first group of lists includes the identifier of the IAB node A and the identifier of the parent node of the IAB node A (namely, the identifier of the IAB node), the second group of lists includes the identifier of the IAB node B and the identifier of the parent node of the IAB node B (namely, the identifier of the IAB node A), and the third group of lists includes the identifier of the terminal device and the identifier of the parent node of the terminal device (namely, the identifier of the IAB node B).

In some embodiments, the identifier of the terminal device may be a UE XnAP ID, the identifier of the IAB node may be a UE XnAP ID or a BAP address, the identifier of the IAB node A may be a UE XnAP ID or a BAP address, and the identifier of the IAB node B may be a UE XnAP ID or a BAP address. This is not limited herein.

In some embodiments, based on the handover request message sent by the source donor node, the target donor node may obtain the topology relationship between the IAB node, the other IAB node, and the terminal device. In addition to the implementations mentioned in the foregoing embodiment, the target donor node may further obtain the topology relationship between the IAB node, the other IAB node, and the terminal device in another manner. This is not limited herein.

In some embodiments, if the terminal device is directly connected to the IAB node, the source donor node may include the context information of the IAB node and the context information of the terminal device in one handover request message and send the handover request message to the target donor node, or may include the context information of the IAB node and the context information of the terminal device in different handover request messages and send the handover request messages to the target donor node. This is not limited herein.

Similarly, if the terminal device accesses the IAB node through at least one other IAB node, the source donor node may include the context information of the IAB node, the context information of the other IAB node, and the context information of the terminal device in one handover request message and send the handover request message to the target donor node, or may include the context information of the IAB node, the context information of the other IAB node, and the context information of the terminal device in different handover request messages and send the handover request messages to the target donor node. This is not limited herein.

In some embodiments, in addition to the foregoing step 201 and step 202, cell configuration information after a first IAB node is handed over to the target donor node changes, and the first IAB node includes the IAB node and another accepted IAB node in the other IAB nodes. There are a plurality of implementations in which the IAB node receives updated cell configuration information from the target donor node through the source donor node. A specific implementation is described in detail in the following embodiments.

Figure 12:
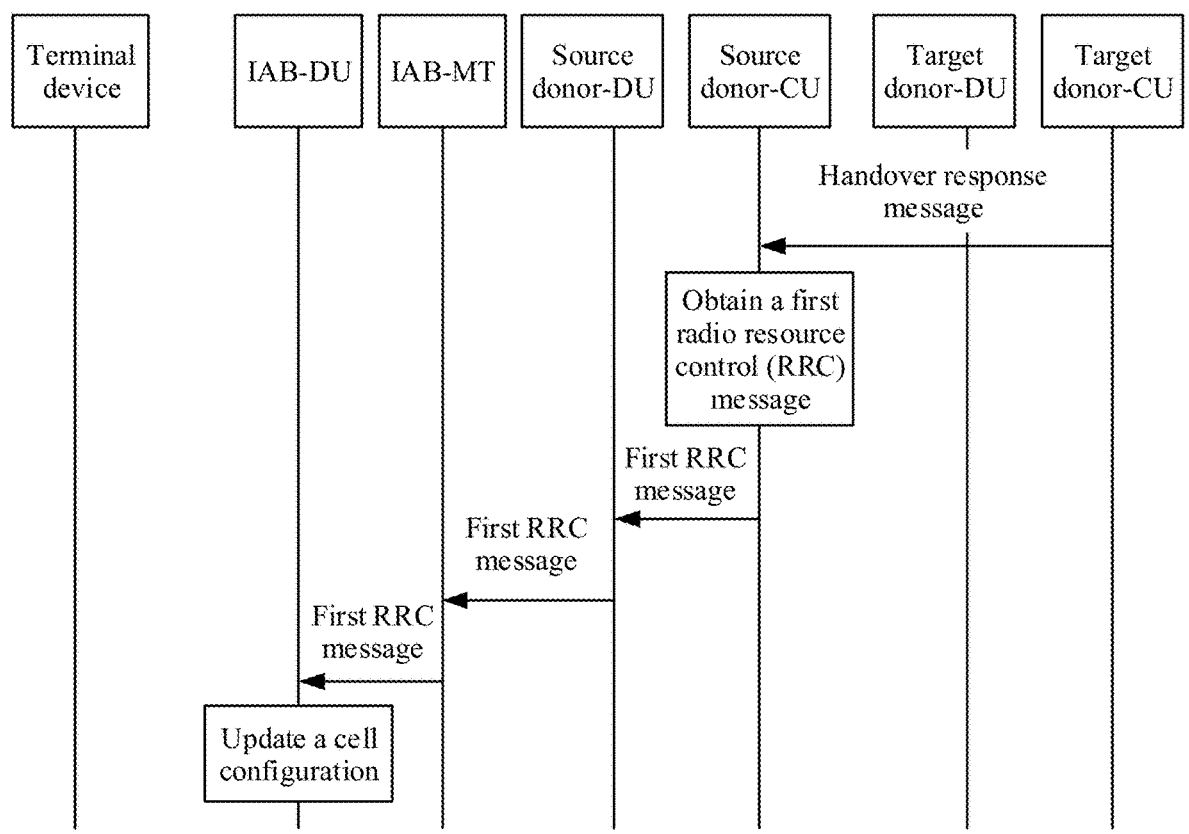
FIG. 12 is a schematic diagram of another embodiment of a node handover method according to this application.

FIG. 12 is a schematic diagram of an embodiment of sending configuration information by a source donor node in a node handover method according to this application.

Refer to FIG. 12. In a possible implementation, the source donor node includes a source donor-CU, a target donor node includes a target donor-CU, and a first IAB node includes a first IAB-MT and a first IAB-DU.

The target donor-CU sends a handover response message to the source donor node.

In some embodiments, after the target donor-CU receives a handover request message, the target donor-CU updates a cell configuration of the first IAB node. For example, optionally, the target donor-CU may update a cell global identifier (CGI) of the IAB-DU. Optionally, the target donor-CU may also update a cell identity of the IAB-DU. This is not limited herein. The updated cell configuration is carried in the handover response message, and the handover response message is sent to the source donor-CU. Specifically, the handover response message includes a first RRC message generated by the target donor-CU, the first RRC message includes cell configuration information after the first IAB node is handed over to the target donor node, and the first IAB node includes an IAB node and another accepted IAB node in the other IAB nodes.

The source donor-CU obtains the first RRC message from the handover response message.

The source donor-CU sends the first RRC message to the first IAB-MT through a source donor-DU.

In some embodiments, the target donor-CU includes updated cell configuration information of the first IAB-DU in the first RRC message (RRC Reconfiguration) generated by the target donor-CU, and then encapsulates the first RRC message into the handover response (e.g., Handover Request Acknowledge) message and sends the handover response message to the source donor-CU. After extracting the first RRC message from the handover response message, the source donor-CU sends the first RRC message to the first IAB-MT through the source donor-DU. The first IAB-MT extracts the updated cell configuration of the first IAB-DU from the first RRC message, and sends the received updated cell configuration of the first IAB-DU to the first IAB-DU through an internal interface, so that the first IAB-DU updates the cell configuration.

In some embodiments, after the source donor node sends the handover request message to the target donor node, the cell configuration of the first IAB-DU is updated. For example, a base station identifier included in the identifier CGI or the cell identity of the cell served by the first IAB-DU is consistent with an identifier of a base station to which the donor-CU belongs. In a handover process, the first IAB-DU obtains new configuration information from the target donor-CU.

Figure 13:
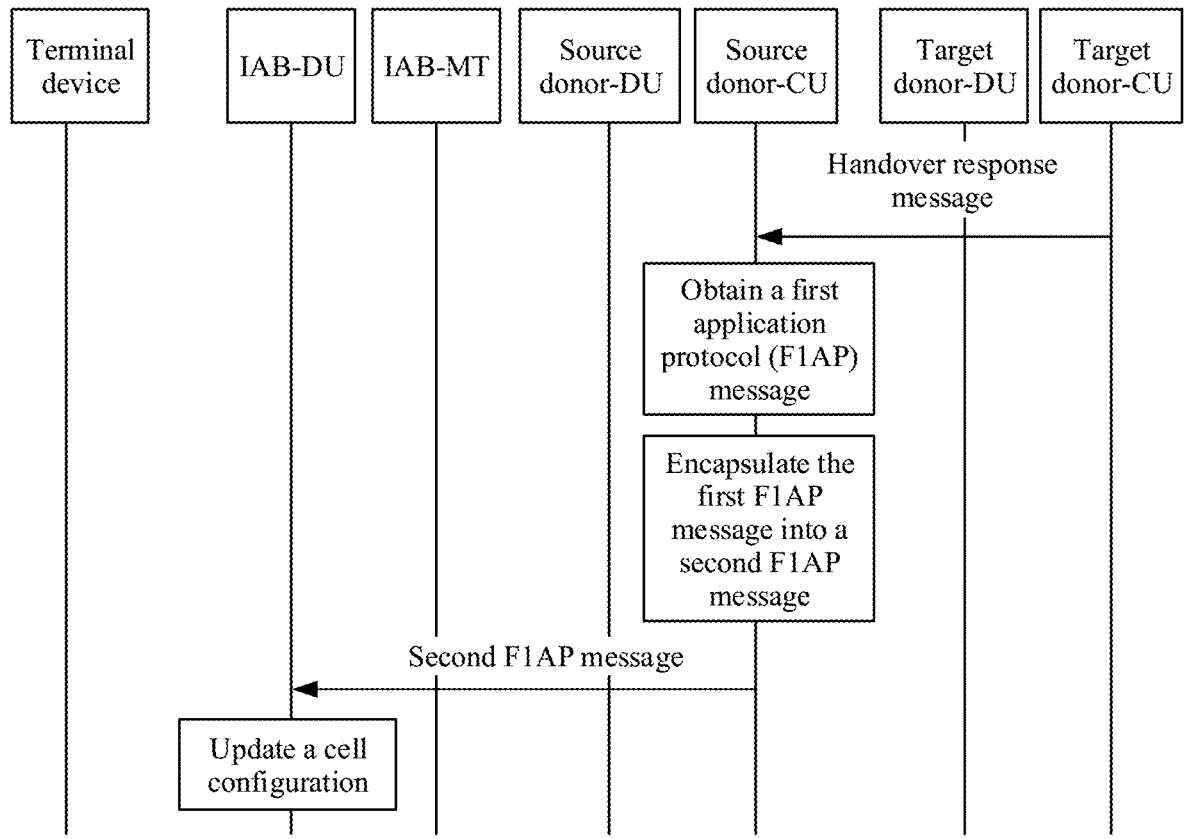
FIG. 13 is a schematic diagram of another embodiment of a node handover method according to this application.

FIG. 13 is a schematic diagram of an embodiment of sending configuration information by a source donor node in a node handover method according to this application.

Refer to FIG. 13. In a possible implementation, the source donor node includes a source donor-CU, a target donor node includes a target donor-CU, and a first IAB node includes a first IAB-MT and a first IAB-DU.

The target donor-CU sends a handover response message to the source donor node.

In some embodiments, the handover response message includes a first F1AP message, the first F1AP message includes cell configuration information after the first IAB node is handed over to the target donor node, and the first IAB node includes an IAB node and another accepted IAB node in the other IAB nodes.

The source donor-CU obtains the first application protocol F1AP message from the handover response message.

The source donor-CU encapsulates the first F1AP message into a second F1AP message, and sends the second F1AP message to the first IAB-DU.

In some embodiments, after the source donor-CU encapsulates the first F1AP message into the second F1AP message, the source donor-CU sends the second F1AP message to the first IAB-DU, so that the first IAB-DU updates the cell configuration.

In some embodiments, for example, the target donor-CU includes updated cell configuration information of the first IAB-DU in the first F1AP message generated by the target donor-CU. Optionally, the first F1AP message may be a newly defined F1AP message, or may be an existing F1AP message, for example, a gNB configuration update message (gNB-CU Configuration Update). This is not limited herein. Then, the target donor-CU includes the F1AP message in a handover request acknowledge message and sends the message to the source donor-CU. The source donor-CU extracts the first F1AP message from the handover request acknowledge message, includes the first F1AP message in the second F1AP message, and sends the second F1AP message to the first IAB-DU through the source donor-DU. The first IAB-DU extracts, from the second F1AP message, the first F1AP message generated by the target donor-CU, so that the first IAB-DU updates the cell configuration.

In some embodiments, after the source donor node sends a handover request message to the target donor node, the cell configuration of the first IAB-DU is updated. For example, a base station identifier included in an identifier CGI or a cell identity of a cell served by the first IAB-DU is consistent with an identifier of a base station to which the donor-CU belongs. In a handover process, the first IAB-DU obtains new configuration information from the target donor-CU.

Figure 14:
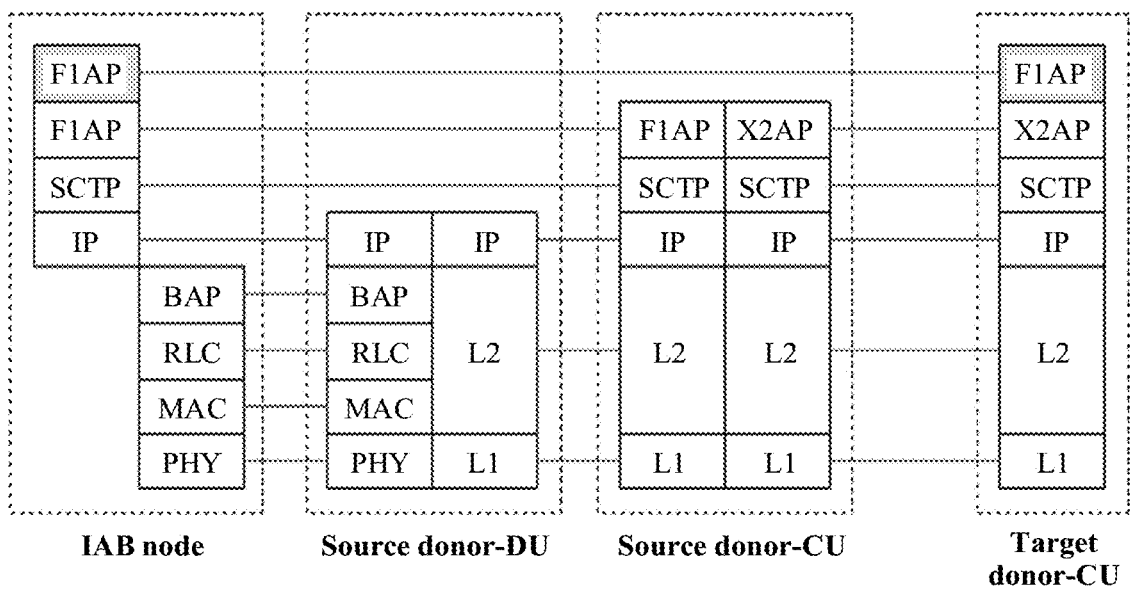
FIG. 14 is a schematic diagram of another embodiment of a node handover method according to this application.

The embodiment provided in FIG. 13 in this application affects an existing IAB protocol stack. A protocol stack architecture corresponding to the embodiment provided in FIG. 13 in this application is shown in FIG. 14. That is, an F1AP message carries an F1AP message.

Figure 15:
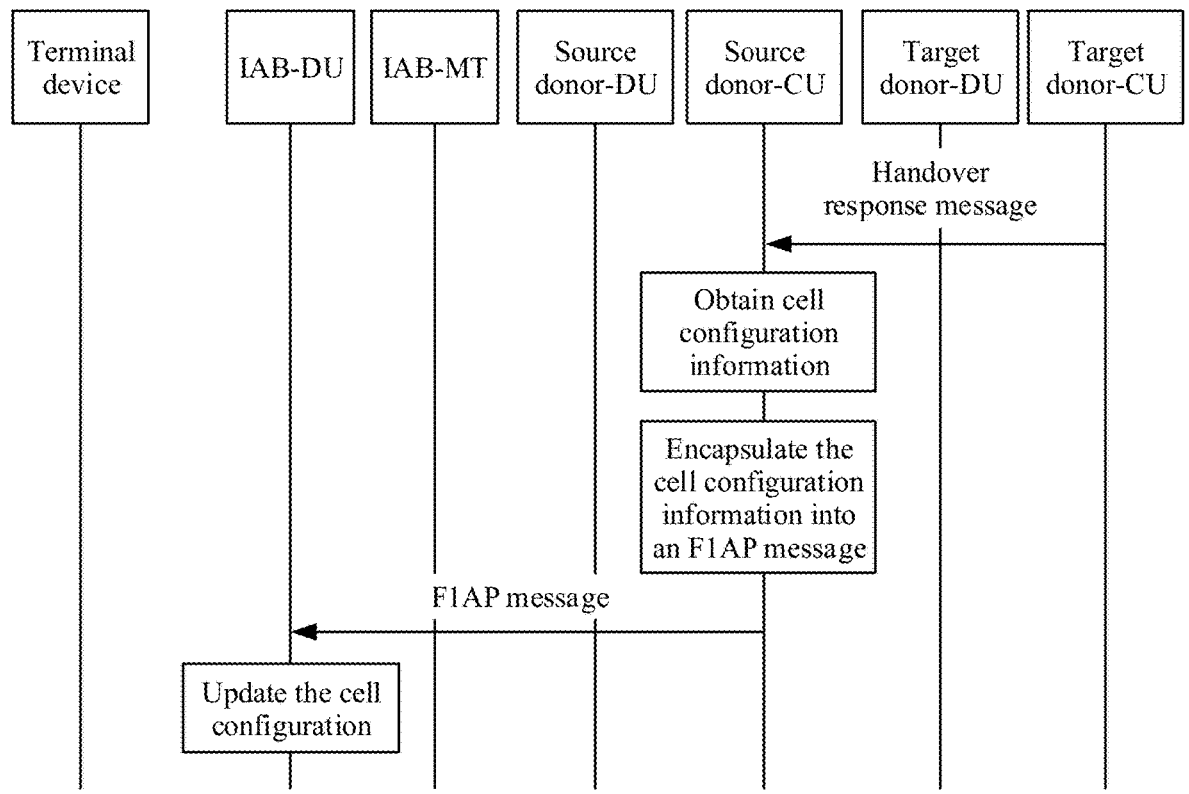
FIG. 15 is a schematic diagram of another embodiment of a node handover method according to this application.

FIG. 14 is a schematic diagram of a protocol stack architecture in which a source donor node sends configuration information in a node handover method according to this application. FIG. 15 is a schematic diagram of an embodiment of sending configuration information by a source donor node in a node handover method according to this application.

Refer to FIG. 15. In a possible implementation, the source donor node includes a source donor-CU, a target donor node includes a target donor-CU, and a first IAB node includes a first IAB-MT and a first IAB-DU.

The target donor-CU sends a handover response message to the source donor node.

In some embodiments, the handover response message includes cell configuration information after the first IAB node is handed over to the target donor node, and the first IAB node includes an IAB node and another accepted IAB node in the other IAB nodes.

The source donor-CU obtains, from the handover response message, the cell configuration information after the first IAB node is handed over to the target donor node.

The source donor-CU encapsulates, in an F1AP message, the cell configuration information after the first IAB node is handed over to the target donor node, and sends the F1AP message to the first IAB-DU.

In some embodiments, for example, the target donor-CU includes updated cell configuration information of the first IAB-DU in a handover request acknowledge message, and sends the handover request acknowledge message to the source donor-CU. The source donor-CU extracts the updated cell configuration information of the first IAB-DU from the handover request acknowledge message, includes the updated cell configuration information of the first IAB-DU in the F1AP message generated by the source donor-CU, and sends the F1AP message to the first IAB-DU, so that the first IAB-DU updates the cell configuration. Optionally, the F1AP message generated by the source donor-CU may be a newly defined message, or may be an existing F1AP message, for example, a gNB-CU configuration update message. This is not specifically limited herein.

In some embodiments, after the source donor node sends a handover request message to the target donor node, the cell configuration of the first IAB-DU is updated. For example, a base station identifier included in an identifier CGI or a cell identity of a cell served by the first IAB-DU is consistent with an identifier of a base station to which the donor-CU belongs. In a handover process, the first IAB-DU obtains new configuration information from the target donor-CU.

The embodiments shown in FIG. 12 to FIG. 15 illustrate three manners of sending cell configuration information. Optionally, the target donor-CU may further send, to the first IAB node in another manner, the cell configuration information after the first IAB node is handed over to the target donor node. This is not limited herein.

The embodiments described in FIG. 12 to FIG. 15 may be implemented based on the embodiment described in step 201 and step 202, or may be separately implemented without being based on the embodiment described in step 201 and step 202. This is not limited herein.

In some embodiments, in addition to the foregoing step 201 and step 202, the target donor node further sends a context setup request message to the IAB node. This step is described in detail in the following embodiments.

In some embodiments, the source donor node includes the source donor-CU, and the target donor node includes the target donor-CU.

Scenario 1: It is assumed that a terminal device is directly connected to the IAB node.

The target donor-CU sends the context setup request message to the IAB node.

In some embodiments, the context setup request message carries an identifier of the terminal device, and the identifier of the terminal device includes an identifier of a cell that is accessed by the terminal device and that is served by the IAB node and an identifier C-RNTI of the terminal device in the accessed cell. Optionally, the identifier of the cell that is accessed by the terminal device and that is served by the IAB node may be a PCI, a CGI, or another identifier. This is not limited herein.

In some embodiments, a context of a child node of the IAB node is set up between the IAB node and the target donor-CU. In this embodiment, the child node of the IAB node is the terminal device. That is, a context of the terminal device is set up between the IAB node and the target donor-CU.

Specifically, before and after the IAB node is handed over, the identifier PCI of the cell served by the IAB-DU of the IAB node remains unchanged, and the identifier C-RNTI of the terminal device in the cell served by the IAB-DU remains unchanged. Provided that the IAB-MT of the IAB node successfully accesses the target donor-CU, the target donor-CU sends the context setup request message (e.g., UE Context Setup Request) to the IAB-DU of the IAB node. The message carries the identifier of the terminal device in the cell served by the IAB-DU of the IAB node. Optionally, the identifier may be a combination of the PCI and the C-RNTI, or may be a combination of the CGI and the C-RNTI. This is not limited herein. The CGI may be an identifier of a cell served by the IAB-DU of the IAB node under the source donor node, or may be an identifier of a cell served by the IAB-DU of the IAB node under the target donor node. Based on the identifier of the terminal device in the cell served by the IAB-DU of the IAB node, the IAB-DU of the IAB node can learn of a specific terminal device for which the UE context setup request message requests to set up a context.

Scenario 2: It is assumed that a terminal device is connected to the IAB node through at least one other IAB node.

The target donor-CU sends a context setup request message to a second IAB node, where the second IAB node is an access node or a parent node of the terminal device, namely, another IAB node in the at least one other IAB node accessed by the terminal device, where the context setup request message carries an identifier of the terminal device, and the identifier of the terminal device is an identifier of a cell that is accessed by the terminal device and that is served by the other IAB node in the at least one other IAB node and an identifier C-RNTI of the terminal device in the accessed cell. Optionally, the identifier of the cell that is accessed by the terminal device and that is served by the second IAB node may be a PCI, a CGI, or another identifier. This is not limited herein.

In some embodiments, a context of a child node of the second IAB node is set up between the second IAB node and the target donor-CU. In this embodiment, the child node of the second IAB node is the terminal device. That is, a context of the terminal device is set up between the second IAB node and the target donor-CU.

Specifically, before and after the second IAB node is handed over, the PCI of a cell served by the IAB-DU of the second IAB node remains unchanged, and the identifier C-RNTI of the terminal device in the cell served by the IAB-DU of the second IAB node remains unchanged. Provided that the IAB-MT of the second IAB node successfully accesses the target donor-CU, the target donor-CU sends the context setup request message (e.g., UE Context Setup Request) to the IAB-DU of the second IAB node. The message carries the identifier of the terminal device in the cell served by the IAB-DU of the second IAB node. Optionally, the identifier may be the PCI and the C-RNTI, or may be the CGI and the C-RNTI. This is not limited herein. The CGI may be an identifier of a cell served by the IAB-DU of the second IAB node under the source donor node, or may be an identifier of a cell served by the IAB-DU of the second IAB node under the target donor node. Based on the identifier of the terminal device in the cell served by the IAB-DU of the second IAB node, the IAB-DU of the second IAB node can learn of a specific terminal device for which the UE context setup request message requests to set up a context.

A plurality of different embodiments related to the context setup request message sent by the target donor node to the IAB node may be implemented based on the embodiment described in step 201 and step 202, or may be separately implemented without being based on the embodiment described in step 201 and step 202. This is not specifically limited herein.

In some embodiments, in addition to step 201 and step 202, if the terminal device is connected to the IAB node through the at least one other IAB node, the target donor node or the IAB node further sends first indication information and/or second indication information to the other IAB node, where the first indication information indicates handover of the IAB node is completed, and the second indication information indicates that the IAB node is being handed over or prepares to be handed over.

This step is described in detail in the following embodiments.

In the conventional technology, after the IAB node is handed over to the target donor node, the other IAB node cannot sense that handover of the IAB node is completed, that is, cannot sense that a link between the IAB node and the target donor node is available. Consequently, an IAB-DU of the other IAB node cannot determine when to trigger application layer processing. Optionally, the application layer processing may be that the IAB-DU of the other IAB node triggers setup of a stream control transmission protocol (SCTP) association with the target donor node (for example, the target donor-CU), or may be that the IAB-DU of the other IAB node triggers a request for obtaining a new configuration from an operation, administration, and maintenance (OAM) server, or may be another processing manner. This is not limited herein.

For example, when handover of the IAB node has not been completed, the link between the IAB node and the target donor node is unavailable. Handover of the IAB node has not been completed, which indicates that the IAB node has not successfully handed over to the target donor node. Consequently, an air interface link between the IAB node and the target donor node has not been set up, and bearer mapping and routing on the link between the IAB node and the target donor node are not configured. In this way, data transmission cannot be performed, and it may be considered that the link is unavailable. If the IAB-DU of the other IAB node triggers the application layer processing at this time and triggers a request for setting up the SCTP association with the target donor node (for example, the donor-CU), the IAB-DU of the other IAB node cannot receive a response, to the request for the SCTP association, that is sent by the target donor node. Consequently, the IAB-DU of the other IAB node considers that a bottom-layer link is unavailable, and an SCTP association setup process fails.

To resolve the foregoing problem, in some embodiments, the target donor node or the IAB node may send the first indication information and/or the second indication information to the other IAB node, where the first indication information indicates that handover of the IAB node is completed, that is, the IAB node has been handed over to the target donor node, and the second indication information indicates that the IAB node is being handed over or prepares to be handed over. The other IAB node may be a child node, a grandchild node, or a great-grandchild node of the IAB node.

Manner 1: The target donor node sends the first indication information and/or the second indication information to the other IAB node.

In some embodiments, the target donor node includes the target donor-CU, the IAB node includes an IAB-MT 1 and an IAB-DU 1, and the other IAB node includes an IAB-MT 2 and an IAB-DU 2.

1. The target donor-CU sends the second indication information to the other IAB node.

In some embodiments, after receiving the handover request message sent by the source donor-CU, the target donor-CU learns that the IAB node and the other IAB node are to be handed over to the target donor-CU together. In this case, an RRC reconfiguration message (or a handover command message) sent by the target donor-CU to the other IAB node carries the second indication information, to indicate that the IAB node prepares to be handed over or is being handed over.

2. The target donor-CU sends the first indication information to the other IAB node.

In some embodiments, if the IAB node has been handed over to the target donor node, that is, the IAB-MT 1 has been handed over to the target donor-CU, the target donor-CU sends the first indication information to the IAB-MT 2, where the first indication information indicates that the IAB node has been handed over to the target donor node, that is, the IAB node has been handed over to the target donor node.

For example, after the IAB node is successfully handed over to the target donor node, or after the IAB-MT 1 receives BAP configuration information (for example, route configuration information and/or bearer mapping configuration information of a BAP layer) of the target donor-CU, the target donor-CU sends the first indication information to the IAB-MT 2, where the first indication information is carried in an RRC message for sending.

Manner 2: The IAB node sends the first indication information and/or the second indication information to the other IAB node.

In some embodiments, the target donor node includes the target donor-CU, the IAB node includes an IAB-MT 1 and an IAB-DU 1, and the other IAB node includes an IAB-MT 2 and an IAB-DU 2.

1. The IAB node sends the second indication information to the other IAB node.

In some embodiments, after the IAB-MT 1 receives a handover command message sent by the target donor-CU, the IAB-DU 1 sends the second indication information to the IAB-MT 2, where the indication information indicates that the IAB-MT 1 is being handed over or the IAB-MT 1 prepares to be handed over.

In some embodiments, optionally, the IAB-DU 1 may include the second indication information in a MAC control element (CE) and send the MAC CE to the IAB-MT 2, or may include the second indication information in a BAP control PDU and send the BAP control PDU to the IAB-MT 2. This is not limited herein.

2. The IAB node sends the first indication information to the other IAB node.

For example, after the IAB-MT 1 is successfully handed over to the target donor-CU, or after the IAB-MT 1 receives BAP configuration information of the target donor node (for example, the target donor-CU), the IAB-DU 1 sends the first indication information to the IAB-MT 2.

In some embodiments, optionally, the BAP configuration information may include route configuration information of a BAP layer, or include bearer mapping configuration information, and the BAP configuration information may further include other configuration information. This is not limited herein.

In some embodiments, optionally, the IAB-DU 1 may include the first indication information in a MAC CE and send the MAC CE to the IAB-MT 2, or may include the first indication information in a BAP control PDU and send the BAP control PDU to the IAB-MT 2. This is not limited herein.

A plurality of different embodiments related to the first indication information and/or the second indication information sent by the target donor node or the IAB node to the other IAB node may be implemented based on the embodiment described in step 201 and step 202, or may be separately implemented without being based on the embodiment described in step 201 and step 202. This is not limited herein.

Figure 16:
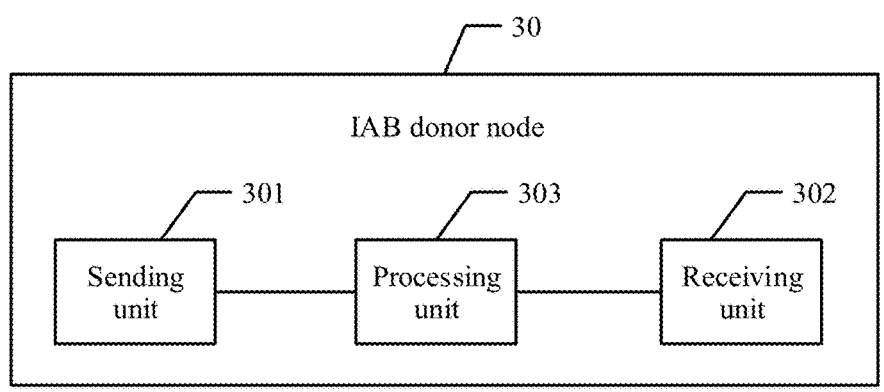
FIG. 16 is a schematic structural diagram of an integrated access and backhaul (IAB) donor node according to this application.

The foregoing embodiments provide different implementations of the node handover method. The following provides an IAB donor node 30. As shown in FIG. 16, the IAB donor node 30 is configured to perform the steps performed by the source donor node in the foregoing embodiments. For details about the execution steps and corresponding beneficial effects, refer to the foregoing corresponding embodiments. Details are not described herein again. The IAB donor node 30 includes: a sending unit 301, a receiving unit 302, and a processing unit 303, where the sending unit 301 is configured to perform a sending action of the source donor node in the node handover method provided in any possible implementation in the foregoing embodiments; the receiving unit 302 is configured to perform a receiving action of the source donor node in the node handover method provided in any possible implementation in the foregoing embodiments; and the processing unit 303 is configured to perform a processing action of the source donor node in the node handover method provided in any possible implementation in the foregoing embodiments.

As shown in FIG. 16, the IAB donor node 30 includes the processing unit and a transceiver unit (e.g., transceiver circuit). The transceiver unit may include the sending unit 301 and the receiving unit 302. For example, the transceiver unit may be a transceiver. The transceiver may include an antenna, a radio frequency circuit, and the like. The processing unit 303 may be a processor (or a processing circuit), for example, a baseband processor. The baseband processor may include one or more central processing units (CPUs). When the IAB donor node 30 is a component having a network device function, the transceiver unit may be a radio frequency unit, and the processing unit may be a processor (or a processing circuit), for example, a baseband processor. When the IAB donor node 30 is a chip system, the transceiver unit may be an input/output interface of a chip (for example, a baseband chip), and the processing unit 303 may be a processor (or a processing circuit) of the chip system, and may include one or more central processing units. It should be understood that, in some embodiments, the processing unit may be implemented by a processor or a processor-related circuit component (or a processing circuit), and the transceiver unit may be implemented by a transceiver or a transceiver-related circuit component.

In addition, the transceiver unit may be one functional module. The functional module can implement both a sending operation and a receiving operation. For example, the transceiver unit may be configured to perform all sending operations and all receiving operations performed by the source donor node in any one of embodiments shown in FIG. 2 to FIG. 15. For example, when a sending operation is performed, it may be considered that the transceiver unit is a sending module; or when a receiving operation is performed, it may be considered that the transceiver unit is a receiving module. Alternatively, the transceiver unit may be two functional modules. The transceiver unit may be considered as a general term of the two functional modules. The two functional modules are the sending unit 301 and the receiving unit 302. The sending unit 301 is configured to implement a sending operation. For example, the sending module may be configured to perform all sending operations performed by the source donor node or the target donor node in any one of embodiments shown in FIG. 2 to FIG. 15. The receiving module is configured to implement a receiving operation. For example, the receiving unit may be configured to perform all receiving operations performed by the source donor node or the target donor node in any one of embodiments shown in FIG. 2 to FIG. 15.

It should be noted that content such as information exchange between the modules of the IAB donor node 30 and the execution processes thereof is based on a same concept as the method embodiments of this application, and achieves same technical effects as the method embodiments of the present disclosure. For specific content, refer to the foregoing descriptions in the method embodiments of this application. Details are not described herein again.

Figure 17:
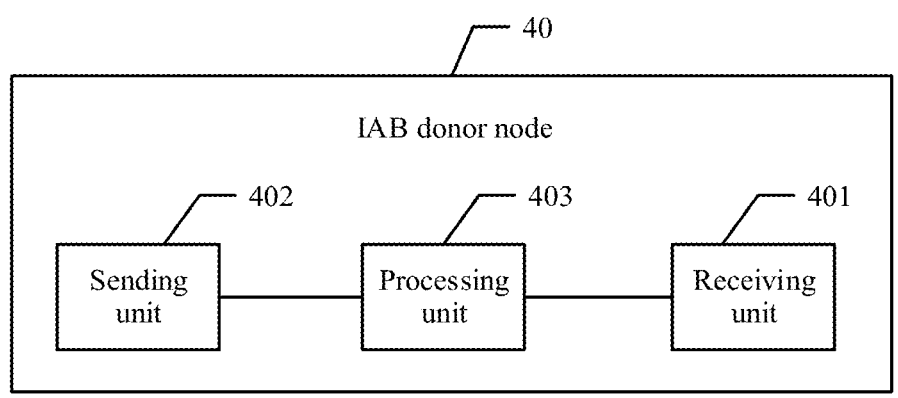
FIG. 17 is another schematic structural diagram of an IAB donor node according to this application.

The foregoing embodiments provide different implementations of the IAB donor node 30. The following provides an IAB donor node 40. As shown in FIG. 17, the IAB donor node 40 is configured to perform the steps performed by the target donor node in the foregoing embodiments. For details about the execution steps and corresponding beneficial effects, refer to the foregoing corresponding embodiments. Details are not described herein again. The IAB donor node 40 includes: a receiving unit 401, a sending unit 402, and a processing unit 403, where the receiving unit 401 is configured to perform a receiving action of the target donor node in the node handover method provided in any possible implementation in the foregoing embodiments; the sending unit 402 is configured to perform a sending action of the target donor node in the node handover method provided in any possible implementation in the foregoing embodiments; and the processing unit 403 is configured to perform a processing action of the target donor node in the node handover method provided in any possible implementation in the foregoing embodiments.

As shown in FIG. 17, the IAB donor node 40 includes the processing unit and a transceiver unit. The transceiver unit may include the sending unit 402 and the receiving unit 401. For example, the transceiver unit may be a transceiver. The transceiver may include an antenna, a radio frequency circuit, and the like. The processing unit may be a processor (or a processing circuit), for example, a baseband processor. The baseband processor may include one or more CPUs. When the IAB donor node 40 is a component having a network device function, the transceiver unit may be a radio frequency unit, and the processing unit may be a processor (or a processing circuit), for example, a baseband processor. When the IAB donor node 40 is a chip system, the transceiver unit may be an input/output interface of a chip (for example, a baseband chip), and the processing unit may be a processor (or a processing circuit) of the chip system, and may include one or more central processing units. It should be understood that, in some embodiments, the processing unit may be implemented by a processor or a processor-related circuit component (or a processing circuit), and the transceiver unit may be implemented by a transceiver or a transceiver-related circuit component.

In addition, the transceiver unit may be one functional module. The functional module can implement both a sending operation and a receiving operation. For example, the transceiver unit may be configured to perform all sending operations and all receiving operations performed by the target donor node in any one of embodiments shown in FIG. 2 to FIG. 15. For example, when a sending operation is performed, it may be considered that the transceiver unit is a sending module; or when a receiving operation is performed, it may be considered that the transceiver unit is a receiving module. Alternatively, the transceiver unit may be two functional modules. The transceiver unit may be considered as a general term of the two functional modules. The two functional modules are the sending unit 402 and the receiving unit 401. The sending unit 402 is configured to implement a sending operation. For example, the sending module may be configured to perform all sending operations performed by the target donor node in any one of embodiments shown in FIG. 2 to FIG. 15. The receiving module is configured to implement a receiving operation. For example, the receiving unit may be configured to perform all receiving operations performed by the target donor node in any one of embodiments shown in FIG. 2 to FIG. 15.

It should be noted that content such as information exchange between the modules of the IAB donor node 40 and the execution processes thereof is based on a same concept as the method embodiments of this application, and achieves same technical effects as the method embodiments of the present disclosure. For specific content, refer to the foregoing descriptions in the method embodiments of this application. Details are not described herein again.

Figure 18:
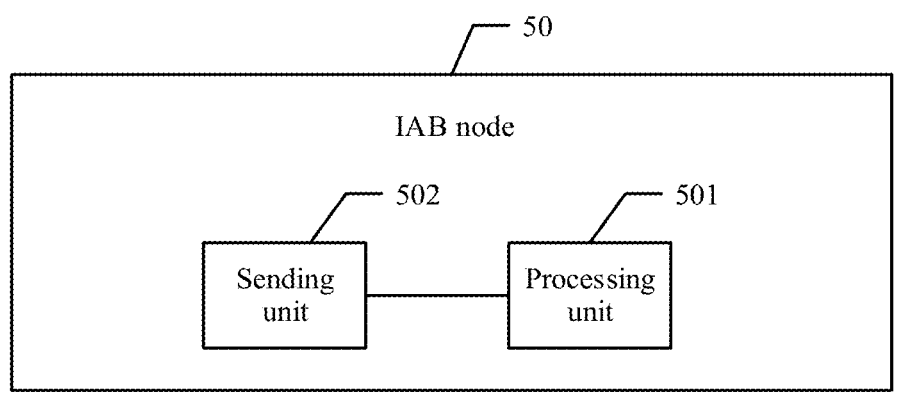
FIG. 18 is a schematic structural diagram of an IAB node according to this application.

The foregoing embodiments provide different implementations of the IAB donor node 40. The following provides an IAB node 50. As shown in FIG. 18, the IAB node 50 is configured to perform the steps performed by the IAB node in the foregoing embodiments. For details about the execution steps and corresponding beneficial effects, refer to the foregoing corresponding embodiments. Details are not described herein again. The IAB node 50 includes: a processing unit 501 and a sending unit 502, where the processing unit 501 is configured to perform a processing action of the IAB node in the node handover method provided in any possible implementation in the foregoing embodiments; and the sending unit 502 is configured to perform a sending action of the IAB node in the node handover method provided in any possible implementation in the foregoing embodiments.

As shown in FIG. 18, the IAB node 50 includes the processing unit and a transceiver unit. The transceiver unit may include the sending unit 502. For example, the transceiver unit may be a transceiver. The transceiver may include an antenna, a radio frequency circuit, and the like. The processing unit 501 may be a processor (or a processing circuit), for example, a baseband processor. The baseband processor may include one or more CPUs. When the IAB node 50 is a component having a network device function, the transceiver unit may be a radio frequency unit, and the processing unit may be a processor (or a processing circuit), for example, a baseband processor. When the IAB node 50 is a chip system, the transceiver unit may be an input/output interface of a chip (for example, a baseband chip), and the processing unit may be a processor (or a processing circuit) of the chip system, and may include one or more central processing units. It should be understood that, in some embodiments, the processing unit 501 may be implemented by a processor or a processor-related circuit component (or a processing circuit), and the transceiver unit may be implemented by a transceiver or a transceiver-related circuit component.

In addition, the transceiver unit may be one functional module. The functional module can implement both a sending operation and a receiving operation. For example, the transceiver unit may be configured to perform all sending operations and all receiving operations performed by the IAB node in any one of embodiments shown in FIG. 2 to FIG. 15. For example, when a sending operation is performed, it may be considered that the transceiver unit is a sending module; or when a receiving operation is performed, it may be considered that the transceiver unit is a receiving module. Alternatively, the transceiver unit may be two functional modules. The transceiver unit may be considered as a general term of the two functional modules. The two functional modules are the sending unit 502 and a receiving unit. The sending unit 502 is configured to implement a sending operation. For example, the sending module may be configured to perform all sending operations performed by the IAB node in any one of embodiments shown in FIG. 2 to FIG. 15.

It should be noted that content such as information exchange between the modules of the IAB node 50 and the execution processes thereof is based on a same concept as the method embodiments of this application, and achieves same technical effects as the method embodiments of the present disclosure. For specific content, refer to the foregoing descriptions in the method embodiments of this application. Details are not described herein again.

Figure 19:
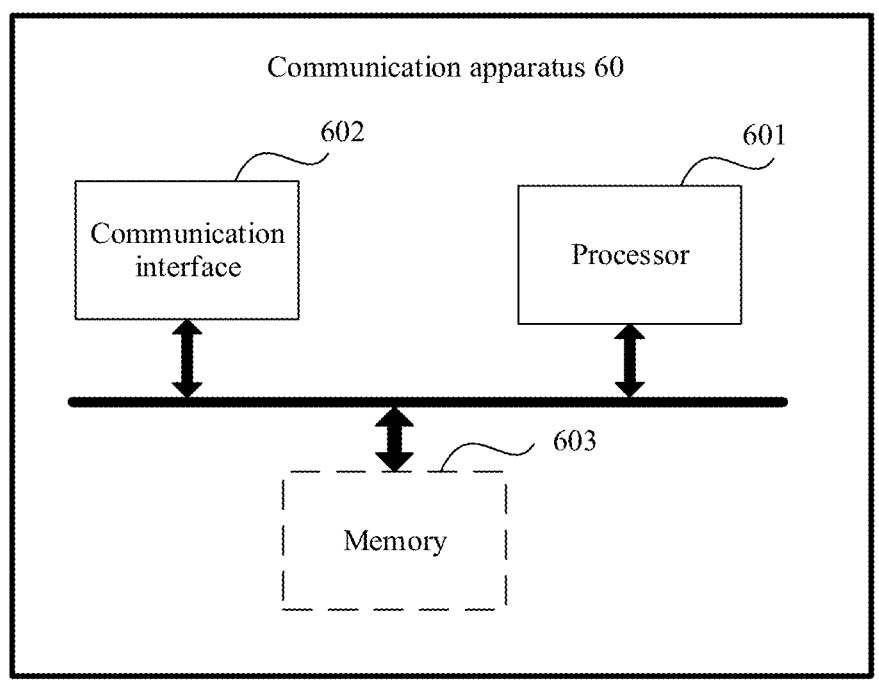
FIG. 19 is a schematic structural diagram of a communication apparatus according to this application.

FIG. 19 is a schematic diagram of a communication apparatus 60 according to an embodiment of this application. The communication apparatus 60 is configured to implement the operations of the source donor node, the target donor node, and the IAB node in the foregoing embodiments. The communication apparatus includes a processor 601 and a communication interface 602. Optionally, the communication apparatus further includes a memory 603. The communication interface 602 is configured to implement communication with another device.

The method performed by the network device or the terminal device in the foregoing embodiments may be implemented by the processor 601 by invoking a program stored in a memory (which may be the memory 603 in the network device or the terminal device, or may be an external memory). To be specific, the apparatus for the source donor node, the target donor node, and the IAB node may include the processor 601. The processor 601 invokes the program in the memory, to perform the method performed by the source donor node, the target donor node, and the IAB node in the foregoing method embodiments. The processor herein may be an integrated circuit having a signal processing capability, for example, a CPU. The apparatus for the source donor node, the target donor node, and the IAB node may be implemented by configuring one or more integrated circuits that implement the foregoing methods, for example, one or more application-specific integrated circuits (ASICs), one or more microprocessors digital signal processors (DSPs), one or more field programmable gate arrays (FPGAs), or a combination of at least two of the integrated circuit forms. Alternatively, the foregoing implementations may be combined.

For example, functions/implementation processes of the processing modules in FIG. 16, FIG. 17, and FIG. 18 may be implemented by the processor 601 in the communication apparatus 60 shown in FIG. 19 by invoking computer-executable instructions stored in the memory 603, and functions/implementation processes of the transceiver units in FIG. 16, FIG. 17, and FIG. 18 may be implemented by the communication interface 602 in the communication apparatus 60 shown in FIG. 19.

It may be clearly understood by a person skilled in the art that, for the purpose of a convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

It should be noted that descriptions in this application are applicable to all embodiments. To avoid repetition, details are not described in each embodiment. It should be understood that the "embodiment" mentioned throughout the specification means a particular feature, structure, or feature related to the embodiment, and the particular feature, structure, or feature may be combined in one or more embodiments in any proper manner. It should be understood that sequence numbers of the foregoing processes do not mean execution sequences in embodiments of the present disclosure. The execution sequences of the processes should be determined based on functions and internal logic of the processes, and should not be construed as any limitation on the implementation processes of embodiments of the present disclosure.

What is claimed is:

1. A node handover method, comprising:
receiving, by a target donor node, a handover request message sent by a source donor node, wherein the handover request message comprises context information of an integrated access and backhaul (IAB) node and context information of at least one terminal device, the context information of the IAB node comprises at least one of an identifier of a parent node of the IAB node, or an identifier of a child node of the IAB node, and the identifier indicates at least one of a topology relationship between the IAB node and the parent node of the IAB node, or between the IAB node and the child node of the IAB node, and wherein the handover request message requests to hand over the IAB node and the at least one terminal device to the target donor node, and a terminal device in the at least one terminal device is directly connected to the IAB node, or the terminal device is connected to the IAB node through at least one other IAB node; and sending, by the target donor node, a handover response message to the source donor node, wherein the handover response message comprises at least one of an identifier of an accepted terminal device in the at least one terminal device or an identifier of a rejected terminal device in the at least one terminal device.

2. The node handover method according to claim 1, wherein the target donor node comprises a target donor-centralized unit (CU), and the method further comprises:
sending, by the target donor-CU, a context setup request message to a first IAB node, wherein the context setup request message carries an identifier of the terminal device, and the identifier of the terminal device comprises an identifier of a cell that is accessed by the terminal device and that is served by the first IAB node and a cell-radio network temporary identifier (C-RNTI) of the terminal device in the accessed cell; and
when the terminal device is directly connected to the IAB node, the first IAB node is the IAB node; or
when the terminal device is connected to the IAB node through the at least one other IAB node, the first IAB node is the at least one other IAB node.

3. The node handover method according to claim 1, wherein the context information of the IAB node further comprises a backhaul adaptation protocol (BAP) address allocated by the source donor node to the IAB node.

4. The node handover method according to claim 1, wherein the context information of the IAB node further comprises an identifier of a child node of the IAB node, and the identifier indicates a topology relationship between the IAB node and the child node of the IAB node.

5. The node handover method according to claim 1, wherein the context information of the IAB node further comprises network topology list information; and
when the terminal device is directly connected to the IAB node, the network topology list information indicates a topology relationship between the IAB node and the terminal device; or
when the terminal device is connected to the IAB node through the at least one other IAB node, the network topology list information indicates a topology relationship between the IAB node and a first IAB node of the at least one other IAB node, and a topology relationship between the first IAB node and the terminal device.

6. The node handover method according to claim 1, wherein the terminal device is connected to the IAB node through the at least one other IAB node, the handover request message comprises context information of a first IAB node of the at least one other IAB node, and the context information of the first IAB node comprises a BAP address allocated by the source donor node to the first IAB node.

7. An apparatus, comprising: at least one processor and at least one memory storing instructions; wherein the instructions are executed by the at least one processor to perform operations of:
receiving as a target donor node, a handover request message sent by a source donor node, wherein the handover request message comprises context information of an integrated access and backhaul (IAB) node and context information of at least one terminal device, the context information of the IAB node comprises at least one of an identifier of a parent node of the IAB node, or an identifier of a child node of the IAB node, and the identifier indicates at least one of a topology relationship between the IAB node and the parent node of the IAB node, or between the IAB node and the child node of the IAB node, and wherein the handover request message requests to hand over the IAB node and the at least one terminal device to the target donor node, and a terminal device in the at least one terminal device is directly connected to the IAB node, or the terminal device is connected to the IAB node through at least one other IAB node; and
sending as the target donor node, a handover response message to the source donor node, wherein the handover response message comprises at least one of an identifier of an accepted terminal device in the at least one terminal device or an identifier of a rejected terminal device in the at least one terminal device.

8. The apparatus according to claim 7, wherein the target donor node comprises a target donor-centralized unit (CU), and the operations further comprise:
sending as the target donor-CU, a context setup request message to a first IAB node, wherein the context setup request message carries an identifier of the terminal device, and the identifier of the terminal device comprises an identifier of a cell that is accessed by the terminal device and that is served by the first IAB node and a cell-radio network temporary identifier (C-RNTI) of the terminal device in the accessed cell; and
when the terminal device is directly connected to the IAB node, the first IAB node is the IAB node; or
when the terminal device is connected to the IAB node through the at least one other IAB node, the first IAB node is the at least one other IAB node.

9. The apparatus according to claim 7, wherein the context information of the IAB node further comprises a backhaul adaptation protocol (BAP) address allocated by the source donor node to the IAB node.

10. The apparatus according to claim 7, wherein the context information of the IAB node further comprises an identifier of a child node of the IAB node, and the identifier indicates a topology relationship between the IAB node and the child node of the IAB node.

11. The apparatus according to claim 7, wherein the context information of the IAB node further comprises network topology list information; and
when the terminal device is directly connected to the IAB node, the network topology list information indicates a topology relationship between the IAB node and the terminal device; or
when the terminal device is connected to the IAB node through the at least one other IAB node, the network topology list information indicates a topology relationship between the IAB node and a first IAB node of the at least one other IAB node, and a topology relationship between the first IAB node and the terminal device.

12. The apparatus according to claim 7, wherein the terminal device is connected to the IAB node through the at least one other IAB node, the handover request message comprises context information of a first IAB node of the at least one other IAB node, and the context information of the first IAB node comprises a BAP address allocated by the source donor node to the first IAB node.

13. An apparatus, comprising: at least one processor and at least one memory storing instructions; wherein the instructions are executed by the at least one processor to perform operations of:
sending as a source donor node, a handover request message to a target donor node, wherein the handover request message comprises context information of an integrated access and backhaul (IAB) node and context information of at least one terminal device, the context information of the IAB node comprises at least one of an identifier of a parent node of the IAB node, or an identifier of a child node of the IAB node, and the identifier indicates at least one of a topology relationship between the IAB node and the parent node of the IAB node, or between the IAB node and the child node of the IAB node, and wherein the handover request message requests to hand over the IAB node and the at least one terminal device to the target donor node, and a terminal device in the at least one terminal device is directly connected to the IAB node, or the terminal device is connected to the IAB node through at least one other IAB node; and receiving as the source donor node, a handover response message sent by the target donor node, wherein the handover response message comprises at least one of an identifier of an accepted terminal device in the at least one terminal device or an identifier of a rejected terminal device in the at least one terminal device.

14. The apparatus according to claim 13, wherein the handover request message further comprises context information of the another IAB node when the terminal device is connected to the IAB node through at least one other IAB node, and the handover response message further comprises at least one of an identifier of another accepted IAB node in the at least one other IAB node, or an identifier of another rejected IAB node in the at least one other IAB node.

15. The apparatus according to claim 13, wherein the context information of the IAB node further comprises an identifier of a child node of the IAB node, and the identifier indicates a topology relationship between the IAB node and the child node of the IAB node.

16. The apparatus according to claim 13, wherein the context information of the IAB node further comprises network topology list information; and when the terminal device is directly connected to the IAB node, the network topology list information indicates a topology relationship between the IAB node and the terminal device; or when the terminal device is connected to the IAB node through the at least one other IAB node, the network topology list information indicates a topology relationship between the IAB node and a first IAB node of the at least one other IAB node, and a topology relationship between the first IAB node and the terminal device.

17. The node handover method according to claim 13, wherein the context information of a first IAB node of the at least one other IAB node further comprises at least one of an identifier of a parent node of the first IAB node, or an identifier of a child node of the first IAB node, and the identifier indicates a topology relationship between the first IAB node and the parent node of the first IAB node, or between the first IAB node and the child node of the first IAB node.

\* \* \* \* \*